US007840509B1

(12) United States Patent
Messina

(10) Patent No.: US 7,840,509 B1

(45) Date of Patent: Nov. 23, 2010

(54) COMPUTER-BASED SYSTEM FOR INTERROGATING A USER AND GENERATING A RESULT

(76) Inventor: Edmund Messina, 1206 Woodwind Trail, Haslett, MI (US) 48840

( * ) Notice: Subject to any disclaimer, the term of this patent is extended or adjusted under 35 U.S.C. 154(b) by 1912 days.

(21) Appl. No.: 10/810,929

(22) Filed: Mar. 26, 2004

Related U.S. Application Data

(60) Provisional application No. 60/457,808, filed on Mar. 26, 2003.

(51) Int. Cl.
*G06F 17/00* (2006.01)
*G06N 5/00* (2006.01)

(52) U.S. Cl. .............................. 706/45; 712/32; 726/23

(58) Field of Classification Search ................... 706/45, 706/47; 712/32; 726/23
See application file for complete search history.

(56) References Cited

U.S. PATENT DOCUMENTS

| | | | | |
|---|---|---|---|---|
| 4,170,987 | A | 10/1979 | Anselmo et al. | |
| 4,279,258 | A | 7/1981 | John | |
| 4,527,567 | A | 7/1985 | Fischler et al. | |
| 4,731,725 | A | 3/1988 | Suto et al. | |
| 4,917,117 | A | 4/1990 | Brom et al. | |
| 4,965,742 | A | 10/1990 | Sheink | |
| 5,007,429 | A | 4/1991 | Treatch et al. | |
| 5,337,373 | A | 8/1994 | Marandici et al. | |
| 5,357,427 | A | 10/1994 | Langen et al. | |
| 5,583,758 | A | 12/1996 | McIlroy et al. | |
| 5,594,638 | A | 1/1997 | Iliff | |
| 5,615,112 | A | 3/1997 | Sheng et al. | |
| 5,810,728 | A | 9/1998 | Kuhn | |
| 5,850,836 | A | 12/1998 | Steiger et al. | |
| 5,878,746 | A | 3/1999 | Lemelson et al. | |
| 5,906,578 | A | 5/1999 | Rajan et al. | |
| 5,909,589 | A * | 6/1999 | Parker et al. | 712/32 |
| 5,911,132 | A | 6/1999 | Sloane | |
| 5,953,704 | A | 9/1999 | McIlroy et al. | |
| 6,049,794 | A | 4/2000 | Jacobs et al. | |
| 6,071,236 | A | 6/2000 | Iliff | |
| 6,394,811 | B2 | 5/2002 | Finitzo et al. | |
| 2002/0026435 | A1* | 2/2002 | Wyss et al. | 707/1 |
| 2003/0101153 | A1* | 5/2003 | Francis et al. | 706/47 |
| 2003/0198934 | A1* | 10/2003 | Sendowski et al. | 434/350 |
| 2005/0065813 | A1* | 3/2005 | Mishelevich et al. | 705/2 |

* cited by examiner

*Primary Examiner*—Michael B. Holmes
*Assistant Examiner*—Kalpana Bharadwaj
(74) *Attorney, Agent, or Firm*—Butzel Long

(57) ABSTRACT

The specification discloses a computer program and computer-based system and method for interrogating a user and generating a result, for example a report, custom video presentation, web-site presentation, etc., based upon the user's interrogatory answers. The computer program comprises a computer-readable memory device encoded with a database comprising a plurality of predefined questions and associated, predefined answers, wherein the plurality of questions and answers are organized in a predefined relationship between a pre-designated starting question and one or more ending questions to thereby define a plurality of possible logical interrogatory paths through the database, and wherein further the selection of any one of the plurality of possible logical paths is user-answer-dependent; a computer-readable memory device encoded with a user interface for displaying questions from the database and accepting answers from a user; and a computer-readable memory device encoded with an engine operative to present questions from the database to the user interface, and to navigate one of the plurality of possible logical interrogatory paths through the database as dictated by a user's answers to the questions presented at the user interface.

20 Claims, 31 Drawing Sheets

Reports Table

Phrase Matching Table

Question Matching Table

Phrase Response Table

Question Response Table

Phrase TextBlock Table

Phrase Report Table

PhraseScore Table

COMPUTER-BASED SYSTEM FOR INTERROGATING A USER AND GENERATING A RESULT

CROSS-REFERENCE TO RELATED APPLICATIONS

This application is related to, and claims the benefit of priority from, U.S. Provisional Patent Application Ser. No. 60/457,808, filed Mar. 26, 2003.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

The invention disclosure includes, by incorporation by reference in its entirety, the computer program listings in the computer program listing appendix, this listing comprising source code for the invention contained on one original and one duplicate compact disc. Each compact disc contains a first uncompressed, PC-Compatible rich text format file entitled "Expert Engine Code.rtf" created on Mar. 26, 2004 of 89 kilobytes, and a second uncompressed, PC-Compatible rich text format file entitled "Expert Interface Code.rtf" created on Mar. 26, 2004, of 58 kilobytes.

The source code listings, as well as the screen displays reproduced in this specification, are subject to copyright protection. The copyright owner consents to facsimile reproduction of the patent document or portions thereof as it appears in the files or records of the U.S. Patent and Trademark Office, but otherwise reserves all rights in these copyrighted materials.

BACKGROUND OF THE INVENTION

The invention relates to a computer program and computer-based system and method for interrogating a user, and more particularly to such an invention comprising a database of processes, including questions, having a predefined relationship between a pre-designated starting process and one or more ending processes to thereby define a plurality of possible logical paths through the database, wherein the selection of one of the possible paths through the database proceeds as dictated by the user's answers to the questions.

It is the case that answer-dependant information is required for the ordered function of contemporary society at virtually all levels, from the seemingly routine, such as the provision of a medical history or insurance coverage data when seeking treatment from a physician, to the more complex, such as performing medical diagnoses, repairing machinery, providing useful instruction to a student, etc. Unfortunately, the accuracy of the information developed from conventional interrogation, whether it be from inter-personal communications or the mere filling out of a form questionnaire, depends at least in part upon the nature and quality of the questions presented, the nature and quality of the answers, as well as the nature and quality of the interrogation process, all of which limitations implicate the more fundamental issue of the scope of the interrogating party's knowledge of the subject of questioning. Thus, in the exemplary, but by no means limited, example of performing medical diagnoses, the accuracy of a resulting diagnosis will often be compromised by the extent of the physician's familiarity with the illness and its symptoms, which familiarity will, in turn, affect the types and number of questions presented to the patient by the physician, and the patient's answers to those questions.

It would therefore be desirable to provide a computer program, system and method for interrogating a user, such as, for instance, a physician, patient, trainee, etc., using an interrogatory database comprising predefined questions, and generating a report, such as a medical diagnosis, patient history, an individualized video presentation, etc.

BRIEF SUMMARY

These and other limitations of prior art interrogation methodologies are addressed by a computer program, system and method for interrogating a user and generating a result, for example a report, video presentation, web-site presentation, etc., based upon the user's interrogatory answers. According to this invention, the computer program comprises: A computer-readable memory device encoded with a database including a plurality of predefined questions and associated, predefined answers, wherein the plurality of questions and answers are organized in a predefined relationship between a pre-designated starting question and one or more ending questions to thereby define a plurality of possible logical interrogatory paths through the database, and wherein further the selection of any one of the plurality of possible logical paths is user-answer-dependent; a computer-readable memory device encoded with a user interface for displaying questions from the database and accepting answers from a user; and a computer-readable memory device encoded with an engine operative to present questions from the database to the user interface, and to navigate one of the plurality of possible logical interrogatory paths through the database as dictated by a user's answers to the questions presented at the user interface.

According to one feature of this invention, the database further comprises content and rules for generating at least one report based upon a user's answers to questions presented at the user interface, the content and rules having a predefined relationship with the plurality of predefined questions and answers of the database so that the content of the at least one report is dependent upon a user's answers to questions from the database, and wherein further the engine is operative to generate from the reporting database at least one report using the content and rules from the database.

Per still another feature of this invention, the database comprising a plurality of predefined questions and associated, predefined answers, includes questions and answers for evaluating a user's level of knowledge respecting a particular subject matter, and wherein further the content and rules for generating the at least one report based upon a user's answers to questions presented at the user interface include content and rules for generating a test score indicative of a user's level of knowledge respecting the particular subject matter.

According to a further feature hereof, the computer-readable memory device encoded with the database, the computer-readable memory device encoded with the user interface, and the computer-readable memory device encoded with the engine all comprise the same computer-readable memory device. Alternatively, the computer-readable memory device encoded with the database, the computer-readable memory device encoded with the user interface, and the computer-readable memory device encoded with the engine may comprise separate computer-readable memory devices.

According to yet another feature of this invention, the database further comprises one or more video files, the engine is operative to display the video files at the user interface, and, furthermore, the one or more video files are associated with the predefined questions and answers of the database so that the display of video files at the user interface is dependent upon a user's answers to questions from the database.

Per another feature, the engine is operative to display a plurality of the video files at the user interface in a continuous sequence the order of which is defined by a user's answers to questions from the database.

According to a still further feature, the database further comprises one or more URL addresses, the engine is operative to display the URL addresses at the user interface, and, furthermore, the one or more URL addresses are associated with the predefined questions and answers of the database so that the display of URL addresses at the user interface is dependent upon a user's answers to questions from the database.

Per yet another feature of this invention, the engine is operative to display a plurality of the URL addresses at the user interface in a sequence the order of which is defined by a user's answers to questions from the database.

According to the method of this invention, there is provided a process for questioning a user and generating a result, for example a report, custom video presentation, web-site presentation, etc., based upon the user's interrogatory answers, by the steps of:

interrogating a user with predefined questions from a computer database comprising the predefined questions and associated, predefined answers, wherein the questions and answers are organized in a predefined relationship between a pre-designated starting question and one or more ending questions to thereby define a plurality of possible logical interrogatory paths through the computer database, the selection of any one of the plurality of possible logical paths being user-answer-dependent, and wherein further the interrogation step is facilitated by an user interface operative to display the predefined questions from the at least one computer database, and to accept answers from a user provided in response to the displayed questions; and displaying a result at the user interface following the interrogation step, wherein the result is based upon a user's answers to the displayed questions.

BRIEF DESCRIPTION OF THE DRAWINGS

These and other features and advantages of the present invention will be better understood upon reference to the specification and drawings, of which.

DETAILED DESCRIPTION

Figure 1:
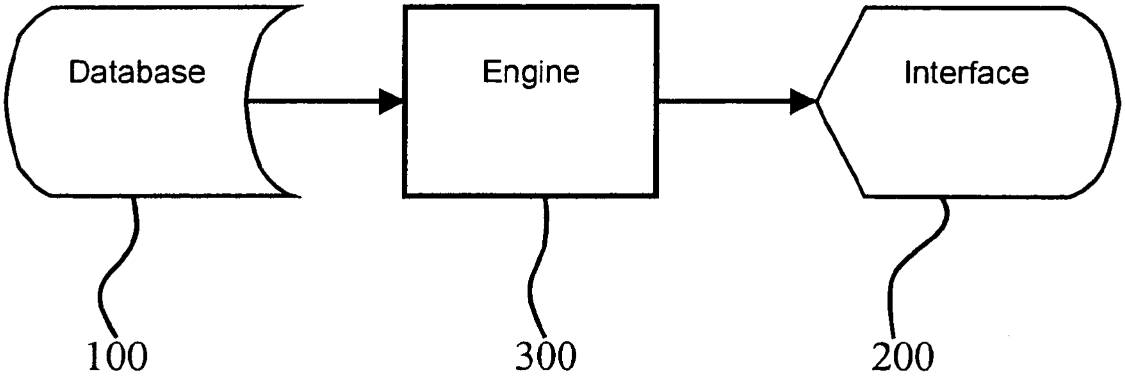
FIG. 1 is a diagram illustrating the interrelationship of the principle elements of the present invention.

Referring now to the drawings, wherein like numerals indicate like or corresponding parts among the several views, the present invention will be seen to generally comprise a computer program and related computer-based system and method for interrogating a user and generating a result based upon the user's interrogatory answers. The program, also referred to by the inventor thereof as FLOBAS™ or an "expert system," is essentially characterized as a means of interrogating a user using a pre-defined database of questions, and providing a result, such as a medical diagnosis, training video, medical history, assisted navigation through one or more web sites, etc., that is user-answer dependent.

As shown diagrammatically in FIG. 1, the present invention generally includes a database 100 comprising a plurality of predefined processes comprising questions and associated answers which are organized in a predefined relationship between a pre-designated starting question and one or more ending questions to thereby define a plurality of possible logical interrogatory paths through the database 100, and wherein further the selection of any one of the plurality of possible logical interrogatory paths is user-answer-dependent; a user interface 200 for displaying questions from the database 100 and facilitating a user's provision of answers to such questions; and an engine 300 operative to present questions from the database 100 to the user interface 200, and to navigate one of the plurality of possible logical interrogatory paths through the database 100 as dictated by a user's responses to the questions presented at the user interface 200.

The database 100 may further comprise content and rules for generating a result in the form of a user report, the content and rules having a predefined relationship between the plurality of predefined questions and answers, so that the content of a given report is dependent upon a user's answers to questions from the database 100. According to this embodiment, engine 300 is further operative to generate such a user report using the report generating content and rules from the database 100.

While the database 100, interface 200, and engine 300 may all reside in the same computer-readable memory, for instance being compiled as a single program on a CD-ROM, etc., to be run on a single computer, it is contemplated that one or more of the database 100, interface 200, and engine 300 may reside in separate locations. Thus, for example, it is contemplated that the present invention may be employed in the context of a global or local computer network, including, for instance, the Internet, whereby the database 100 may be provided in one or even more locations, the engine 300 may be provided in at least a second location, and the interface 200 may be provided in one or more further locations. According to this architecture, it will be appreciated from this disclosure that one or more "experts" will be enabled to define the content of the database 100, even working collectively via a computer network (again, to include local or global networks, such as an intranet or the Internet), which database may thereafter be accessed by one or more users via independent interfaces, such as multiple computer workstations provided at disparate locations, all as mediated by one or more further computers containing the engine 300. Alternatively, the engine 300 and interface 200 may reside on the same computer, while the database 100 resides on one or even more remote computers.

The Database

The database 100 contains, as indicated, a plurality of processes comprising questions and associated answers, these questions and answers organized in a predefined relationship between a pre-designated starting process, i.e., a "first question," and all other questions, to thereby define a plurality of possible logical interrogatory paths through the database which are user-answer dependent. Each of the possible logical interrogatory paths leads to a conclusion constituting one or more of a plurality of possible results. Upon reaching such a conclusion, the result, such as for instance a medical diagnosis, a customized video, a medical history, customized web-browsing, etc., is generated based upon the user's answers to the questions presented during the interrogation. Results in the form of text are generated through a report-writing database. Such results may be presented at the user interface, exported to an output device, such as a printer, exported to a third-party recipient, for instance in the form of an e-mail message, etc.

Figure 2:
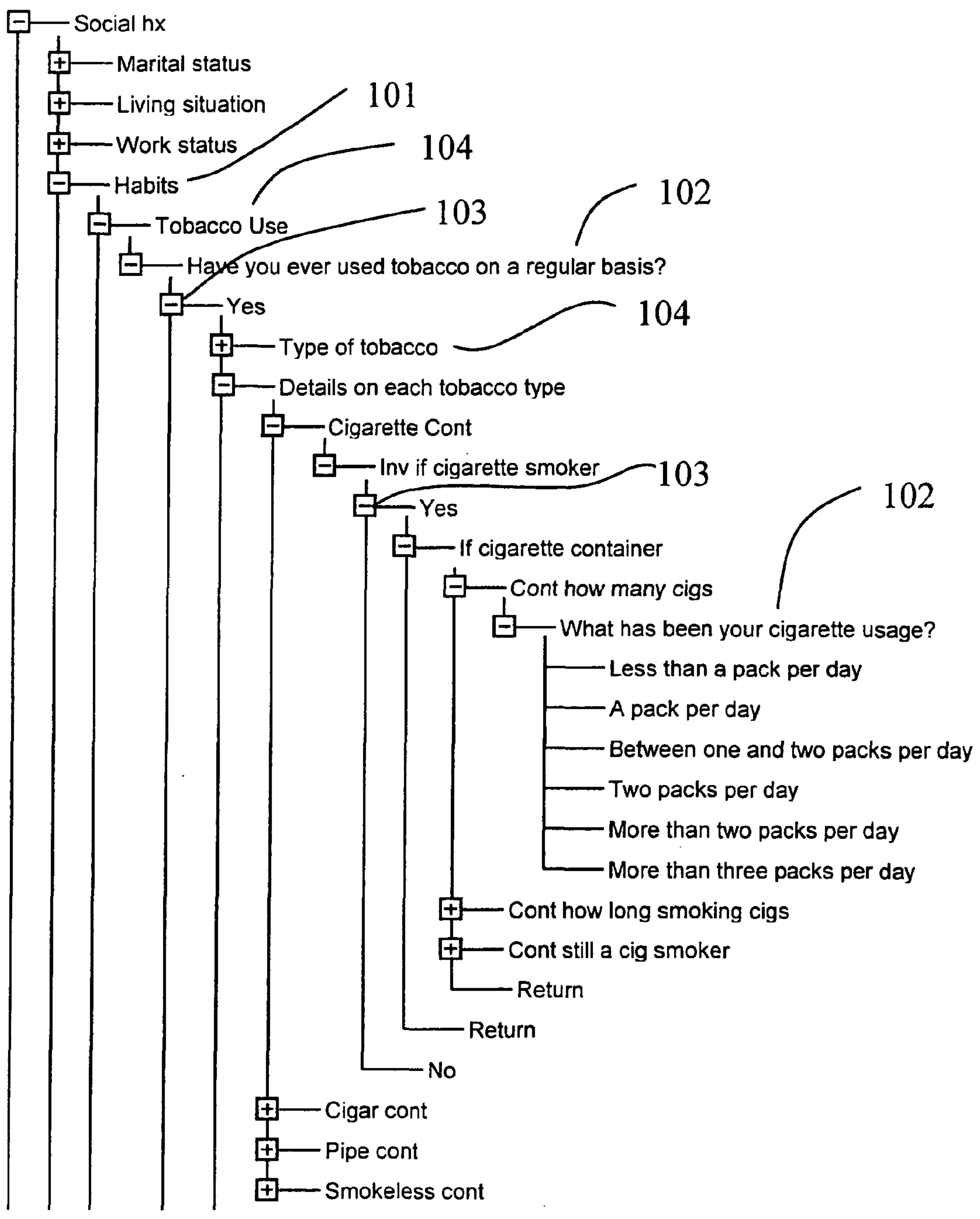
FIG. 2 is a diagram illustrating an exemplary hierarchy of questions and associated answers.

Referring now to FIG. 2, a plurality of predefined exemplary processes comprising questions and associated answers and their interrelationship is particularly illustrated diagrammatically to facilitate an understanding of the "logical interrogatory paths" of this invention. In this example, the questions and answers pertain to a medical history interrogation, and more particularly to an interrogation on patient habits, including smoking. Within the rubric of the more generic category "habits" 101, for example, reside a plurality of subordinate questions 102 and answers 103 defined in sub-categories 104 according to subject matter. From this figure it will be appreciated how a user's answers to questions within a category lead to subsequent, related questions in a logical fashion.

Figure 4:
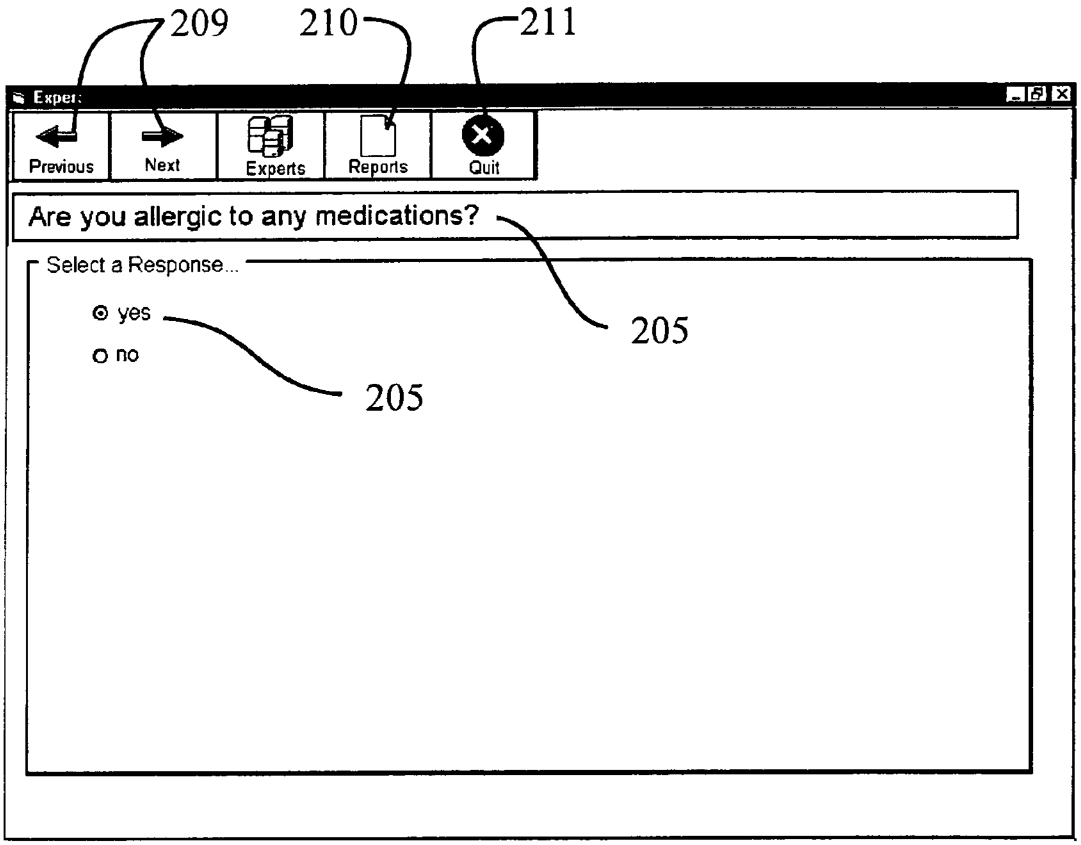
Figure 5:
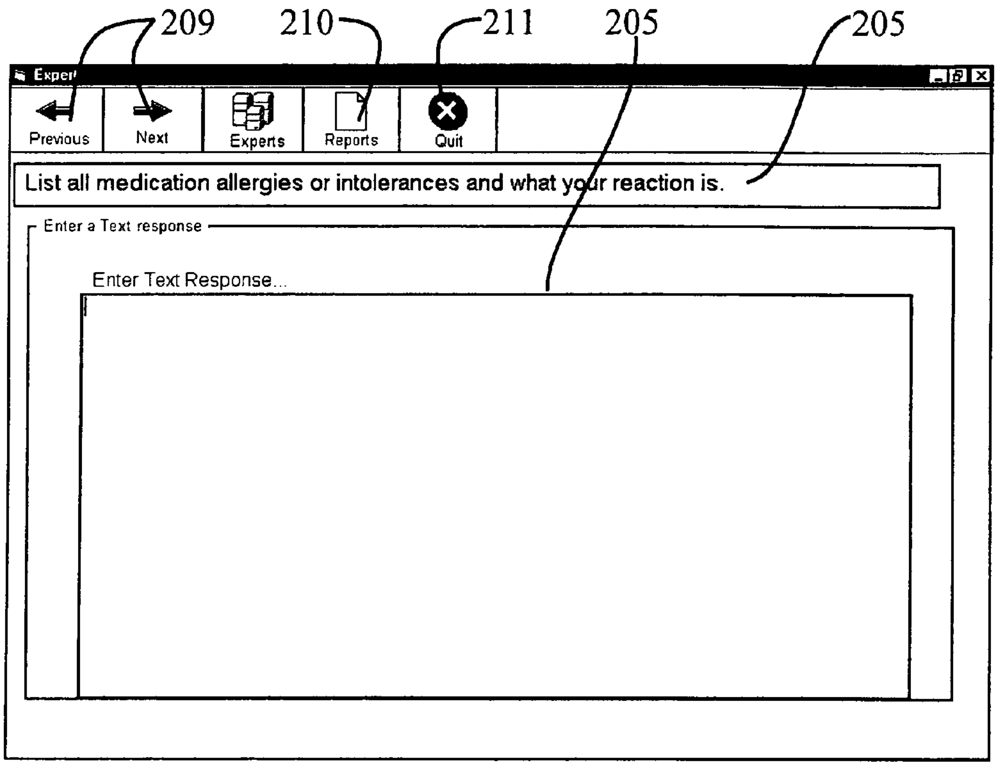

The questions in the database 100 may be in the form of multiple choice questions, preferably allowing only one of several predefined answers, or text questions requiring more expansive answers by the user, such that the user will be required, for example, to enter one or even multiple word responses, such as by entering one or more ASCII characters through a keyboard, alphanumeric keypad, or other human-computer interface means. Display of multiple-choice type questions is exemplified in FIGS. 3 and 4, both of which show an exemplary graphical form (a so-called "graphical user interface" or "GUI") of the user interface 200, while display at the user interface of text questions is exemplified in FIG. 5. Other question and answer forms are of course possible, and it is certainly contemplated by this invention that user responses may be input via other conventional human-computer interface means known to those skilled in the art, including through voice recognition means, touch-screen displays, pen computing devices, computer mice, etc.

Figure 6:
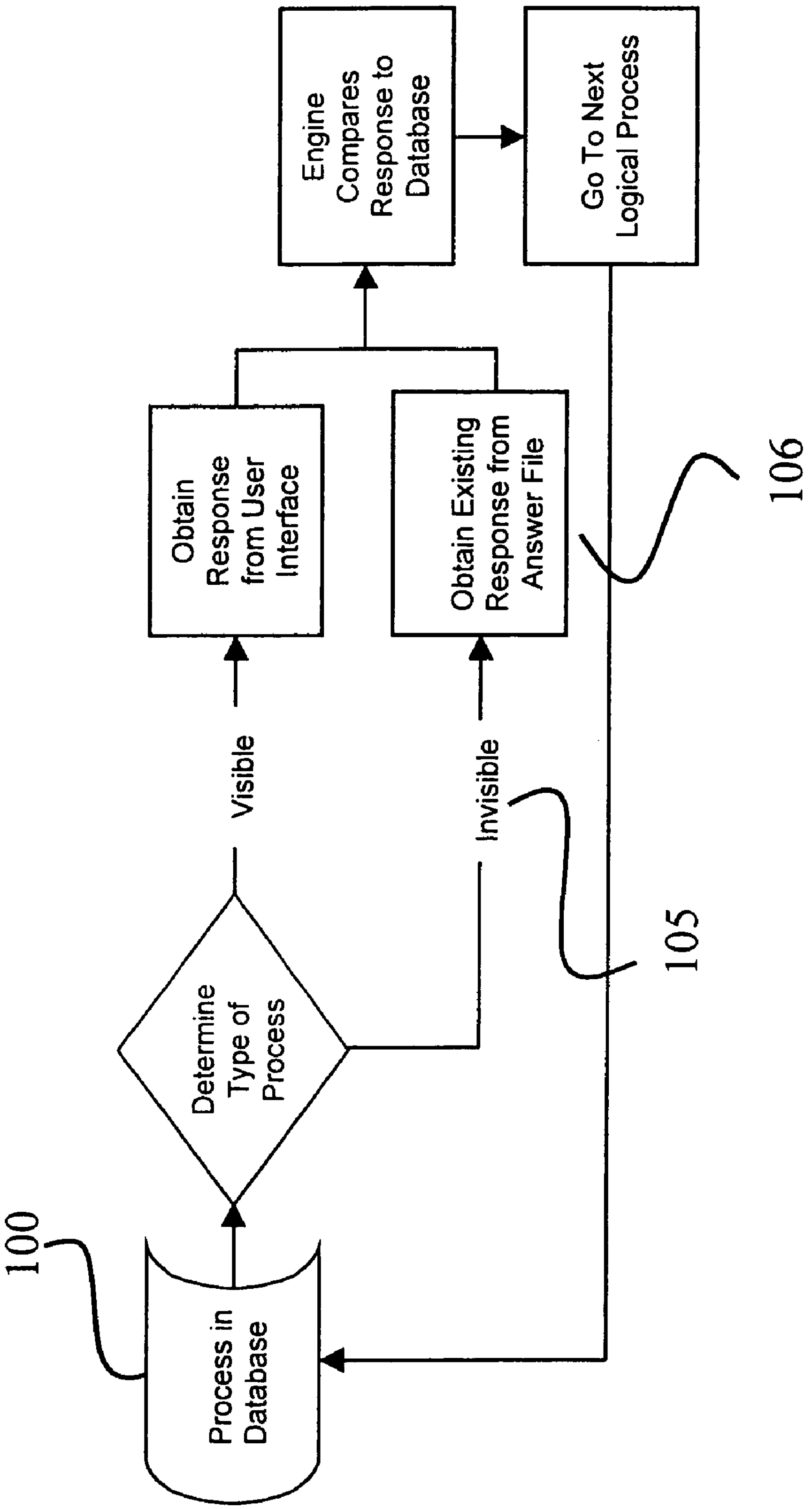
FIG. 6 is a flow diagram depicting in overview the process of answering invisible and visible questions.

Referring to FIG. 6, questions in the database 100 may further be defined as either "invisible" or "visible" in relation to a given logical interrogatory path through the database 100. "Visible" questions are defined as those questions presented to a user, via the user interface 200, to be answered by the user. "Invisible" questions, in contrast, are those which are not presented to the user, but which are instead answered on the basis of one or more previously entered and stored user answers. As shown in overview in FIG. 6, when an invisible question 105 is encountered as the next logical step along one of the possible interrogatory paths through the database 100, the previously entered and stored user answer is retrieved from a storage file 106 and operated upon as the answer to the pending invisible question 105. Invisible questions thus, in effect, answer themselves from this storage file 106 of previously entered user answers, without the requirement for further user response.

Invisible questions and visible questions may be related in any predefined fashion in the database 100, such that, for instance, an invisible question may define the immediate predecessor to a visible question, so that the answer to the invisible question may lead to the immediate presentation of that visible question at the user interface 200. At the user interface 200, this path through the interrogatory database would be apprehended by the user as the sequential presentation of visible questions, any intervening invisible questions simply being answered in the background.

By way of example of the operation of invisible questions, suppose an interrogation session of the inventive computer program in the form of a medical history questionnaire. In this example, several visible questions have previously been presented to the user at the user interface 200, including multiple-choice questions regarding the user's gender and marital status. According to the particular logical interrogatory path taken through the database 100 as dictated by the user's answers to these several visible questions, the next question is defined as invisible. Instead of presenting this question at the user interface 200, the question is thus answered from the user's previously entered and stored response to the same visible question presented earlier in the interrogation session. As indicated, the user is ideally unaware of the processing of invisible questions, being instead presented (via the user interface 200) only the next logical visible process along the path.

To prevent, as desired, the repetitious presentation of questions to the user, the predefined questions in the database 100 may be assigned a property referred to herein as "AskOnce." In the exemplary software, the "AskOnce" property is one of two values, either positive or negative. Upon encountering a question assigned a positive "AskOnce" property, the engine 300 will check the collection of previously input user answers to determine if the current question has already been asked and answered. If such an answer exists, the next step in the interrogatory path will be determined on the basis of the previously input user answer. Upon encountering a question assigned a negative "AskOnce" property, on the other hand, the engine 300 will present the question to the user through the interface 200 regardless of whether the question had been previously asked or not, and the next step in the interrogatory path will be determined by the user's answer to this question. Furthermore, a negative "AskOnce" property also invokes the engine 300 to replace the user's previous answer with the current answer from recurrence of the question.

Questions in the database 100 may be additionally defined in groups of so-called "List Containers," which questions are displayed in the user interface 200 as lists of multiple questions, typically of related content, each question having the same set of possible predefined answers (e.g., "yes," "no," "unknown"). List Container type questions are presented in this manner to reduce the number of screens a user needs to view at the user interface 200, and further to group related questions for ease of interrogation.

Figure 3:
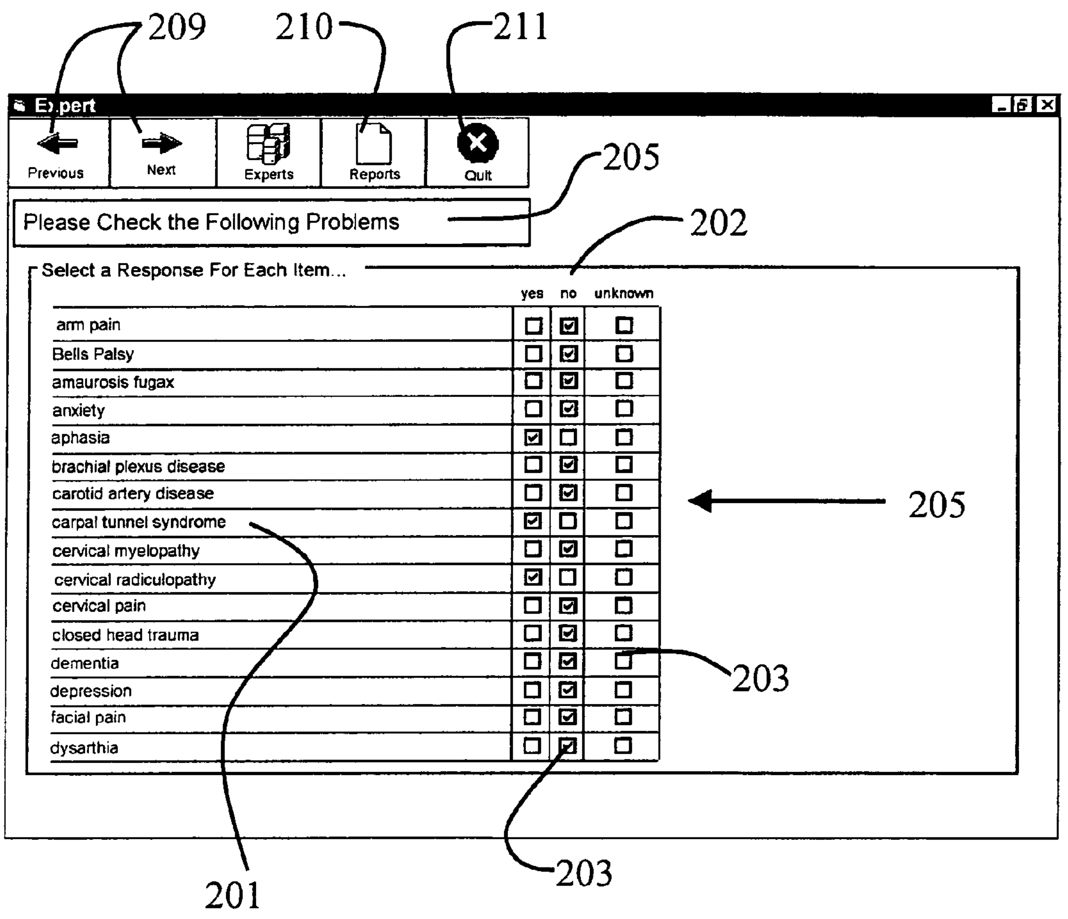
FIGS. 3-5 depict exemplary graphical forms of the user interface of the present invention.

In the exemplary graphical form of the user interface 200 of FIG. 3, the display of List Container questions at the user interface 200 is shown to be in matrix fashion; i.e., in a plurality of rows 201 of questions and columns 202 for answer fields. Check boxes 203 are provided by the user interface, by which the user may designate the desired answers.

No direct branching is allowed within questions included in a List Container; that is, individual questions within a predefined List Container group in the database 100 will not each define individual, disparate interrogatory pathways through the database 100. Instead, the entire set of related questions in a List Container all relate, in predefined fashion, to a next logical question in the database 100. However, individual questions from List Containers, and the associated user answers, may be individually identified and stored in a user answer file, all as explained in more detail elsewhere herein, so as to be individually referenced as required, for instance as needed to provide answers to invisible questions. List Container type questions can further be assigned a positive or negative "AskOnce" property.

As used herein, the term "process" broadly refers to distinct items or groups of items in the database 100, which items may take the form of one or more questions, graphics, text, links to web pages, video content, etc. As such, the database 100 may further comprise other processes in the form of graphical images, text other than in the form of questions (e.g., instructions), links to web pages, video, sound, etc. Such processes may be independent of any other processes. Alternatively, these other processes may be related to multiple other questions and answers in the database 100, such that, for example, a video file is played, or a web page displayed through a browser, at the user interface 200 subsequent to the presentation of a related question, depending upon the answer, or precedent to one or more related questions the presentation of which will depend upon a user's answers following presentation of the video file, display of the web page, etc.

Processes in the nature of graphical images, text other than questions, video, links to web pages, sound, etc. include one of two possible, predefined actions in the inventive program: These processes may be presented at the user interface 200 immediately upon being encountered in the user-answer defined interrogatory path through the database 100, or they may be added to a "storage queue," such as for example a video storage queue or a URL storage queue, for later presentation at the user interface 200 according to a predefined event, such as a predefined answer to a later-presented question, conclusion of an interrogation session, etc.

The foregoing processes other than questions typically will have a predefined relationship only to a next logical question in the database, and so will not themselves define a possible branching in the interrogatory path through the database.

An exemplary, though by no means limiting, application of processes of the foregoing type is in a pretest-type interrogation of a user designed to assess the user's knowledge of a particular subject matter, and thereafter present the user with a result in the form of, for instance, video content or links to web sites tailored to the user's knowledge deficiency in the subject matter. In this example, a user is presented with and answers a series of questions, each question related to a specific video process. Each time the user's response to a question is incorrect in relation to a predefined answer, the related video process relevant to the subject matter on which the user presumably (by means of the incorrect answer) lacks knowledge is sent to a video storage queue. When a user response is correct in relation to a predefined answer, in contrast, the video process is not sent to the storage queue. Upon termination of the interrogation session, a plurality of video processes have thus probably been amassed at the storage queue, which video processes may then be directed, either automatically or upon user prompting, to be played sequentially from the video storage queue as a continuous video presentation tailored to the user's knowledge level on the subject matter of the interrogation. Alternatively, a comparable procedure may be employed to amass a plurality of links to web pages to be presented to the user via the interface 200 upon completion of an interrogation session.

With reference now being had to FIGS. 7-11A, the specific organization of the database 100 in an exemplary embodiment of the inventive computer program will now be more fully described. More particularly, the database 100 will be seen to comprise a plurality of interrelated tables, including tables for various question types, as well as tables for processes, including video processes, links to web pages, etc., all generated with MICROSOFT® ACCESS® software. Of course, the database structure could likewise be created using any of numerous comparable relational database software products known to those skilled in the art, the particular software application employed not being limiting of the present invention.

All of the various tables in the database 100 are linked to a "Main Table," (FIG. 7) including the following data fields: "A_Number" 107, which identifies other, related tables in the database containing information about a particular question or other process; "FM_ID" 108, which serves as the unique identifier for each individual process entry in the table; "Question Type" 109, which contains an identifier of the type of process (e.g., whether multiple choice question, List Container question, video process, text question, web browser process, etc.); "Process Name" 110, which field contains a process name, according to a desired convention adopted by the table compiler(s); "Answer 1," "Answer 2," "Answer 3," etc. 111, containing the possible answer(s) to the question(s) (thus, for example, these "Answer" fields would include all possible, predefined answers for a multiple-choice type question); "Quest Text" or "Que" 112, containing the precise, predefined wording of the question; "Next Question" 113, which field contains the FM_ID, that is, the unique identifier, of the next question or other process to run in the table, presuming no branching in the interrogatory path; and "Choice 1," "Choice 2," "Choice 3," etc. 114, which fields contain the FM_ID of the next question or other process to run if a user's answer to the question corresponds to the related "Answer" field 111.

The "Answer" and "Choice" fields described above are related by content by corresponding field number. Thus, a user's selection of the answer defined in the "Answer 3" field 111, for example, would direct the interrogatory session to the next question or other process designated by FM_ID number in the corresponding "Choice 3" data field 114. If a corresponding "Choice" field 114 is empty, then it follows that no such branching occurs, and the question or other process identified by FM_ID number in the "Next Question" field 113 is run.

Interrogatory type questions are detailed in "Interrogation" tables (FIG. 8), comprising the following data fields: "A_Number" 115, containing an identifier corresponding to the "A_Number" 107 in the Main Table, and by which identifier the Interrogation table entry is linked to the Main Table; "Vis" 116, containing an entry identifying the question as being either visible or invisible; "Type" 117, containing information about the type of question or other process (e.g., a multiple choice question, a numeric type question, a text question, etc.); "Answer Loc" 118, which field contains an identifier of the location of the Answer to Invisible Questions stored in the Answers file 106; "Pic" 119, which field optionally contains a link to an image, such as for instance a graphical image, to display concurrent with display of the question at the user interface; and "AskOnce" 119A, which, as discussed previously, defines whether an individual question is presented to the user more than one time.

As stated, "List Container" process types are composed of a list of related questions with similar responses. "List Container" responses are detailed in "QuestListResponse" tables (FIG. 9), comprising the following data fields: "A_Number" 120, corresponding to an "A_Number" 107 in the Main Table, by which identifier the List Container response is linked to the Main Table; "Pos" 121, identifying the order for displaying the collection of List Container responses at the user interface 200; and "Response" 122, which field contains the precise text to display at the user interface 200. "List Container" questions are detailed in "QuestListItems" tables (FIG. 10), comprising the following data fields: "A_Number" 123, identifying the individual question; "Parent" 124, corresponding to an "A_Number" 107 in the Main Table, by which identifier the List Container question is linked to the Main Table; "Pos" 125, identifying the order for displaying the collection of List Container questions at the user interface; "Process Name" 126, which field contains a process name, according to a desired convention adopted by the table compiler(s); "Quest Text" 127, containing the precise, predefined wording of the question (thus, for example, these "QuestListItems" records would include all possible, predefined questions for a "List Container" type question); "AskOnce" 127A, which field performs a similar role as the AskOnce 119A field in the Interrogation table of FIG. 8 described in detail earlier.

Video processes are detailed in "Video" tables (FIG. 11), comprising the following data fields: "A_Number" 128, containing a number corresponding to an "A_Number" 107 in the Main Table, by which identifier a video process is linked to the Main Table; "File Name" 129, comprising a name or other identifier for the video file; "Queue" 130, containing an instructional identifier for adding the video file to the video storage queue; "Play" 131, comprising process instructions directing the video process to be played immediately upon being encountered; and "PlayQueue" 132, which field contains process instructions directing all of the video files then in the video storage queue to be played. The three data fields "Queue" 130, "Play" 131, and "PlayQueue" 132 are mutually exclusive, such that, for any given video process, only one of these fields will contain instructions.

Web browser or URL processes—i.e., links to predetermined web sites through defined URL addresses—are detailed in the "URL" table (FIG. 11A), comprising the following data fields: "A_Number" 132A, containing a number corresponding to an "A_Number" 107 in the Main Table, by which identifier an URL process is linked to the Main Table; and "Address" 132B, comprising the URL address of the desired web page to be displayed.

To facilitate navigation through one of the plurality of possible logical interrogatory paths in the database 100, the several tables of the exemplary database as described above are interrelated by "A_Number" in the following manner: The Main Table (FIG. 7) links to each of the Interrogation, QuestListResponse, QuestListItems, Video and URL tables as follows: The Main Table field "A_Number" 107 is linked to each of the Interrogation table field "A_Number" 115; QuestListResponse table field "A_Number" 120; QuestListItem table field "Parent" 125; the Video table field "A_Number" 128; and URL table field "A_Number" 132A. The specific one of such tables to link as the engine 300 follows any one interrogatory path through the database 100 is determined by the Main Table field "Question Type" 109. As explained in greater detail below, this "A_Number" identifier information may be stored either temporarily or permanently, along with the user's answer to the question identified by the identifier, during an interrogation session for subsequent operations in that session or even later.

As indicated, the present invention also provides for an optional report writing function, which function is defined in tables in the database 100 containing both content and rules for generating at least one such report. The content and rules in these tables have a predefined relationship with the questions and answers in database 100 tables described above, such that the content of the user report is dependent upon a user's answers to questions from database 100. Moreover, these report-writing tables may contain content and rules for generating multiple different reports using the same collection of stored user answers obtained during an interrogation session.

Figure 12:
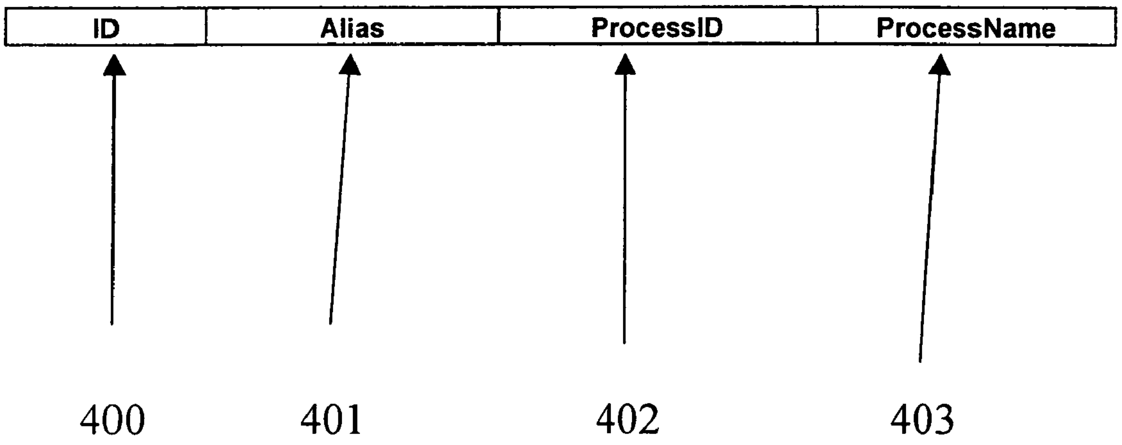
FIGS. 12-19A depict exemplary formats of database tables for defining the content and rules for generating user reports.

Each row in the main Reports table (FIG. 12) is comprised of data defining content to be added in a designated fashion to a report, which content may be in the form of single lines of text, or more complex blocks of text the structure of which is based upon specified report-writing rules and user-answers to questions presented during interrogation. This main Reports table is processed in sequence from beginning to end with each record in the table setting off an algorithm to process a predefined rule and add ASCII characters to the body of the user report.

More particularly, the report is generated by matching report phrases to the user's interrogatory responses. These phrases serve as building blocks for complex sentences, and serve as another way to make decisions about existing data, group information, draw conclusions, define conditional statements or make conclusive, exclusive, inclusive or exceptional statements about the data that was gathered by the user. Based upon the phrase type, the report generator will populate objects and collections from related tables and generate the algorithm that matches the type in the sequential order that the phrases appear.

In this disclosure, the term "phrase" is used to describe each individual record in the report writing tables in the database 100. Each phrase has a specifically defined function and properties according to which the phrases are loaded into a collection. The different types of phrases in the exemplary form of this invention include:

- "Matching," comprising phrases for matching the user's input to a corresponding phrase;
- "Text Blocks," comprising a block of text added to the report independent of the user response;
- "Line Break," directing the addition of a line break to the report;
- "Paragraph Break," directing the addition of a paragraph break to the report;
- "Page Break," directing the addition of a page break to the report;

"Response," directing the addition of a user text response to the report;

"Report Module," comprising an outside report created and added to the report;

"System Date," which directs the addition of the system date to report;

"System Time," which directs the addition of the system time to report;

"System Date/Time," which directs the addition of both the system date and the system time to the report; and "Score," comprising statistics of user response to be added to the report.

Figure 21:
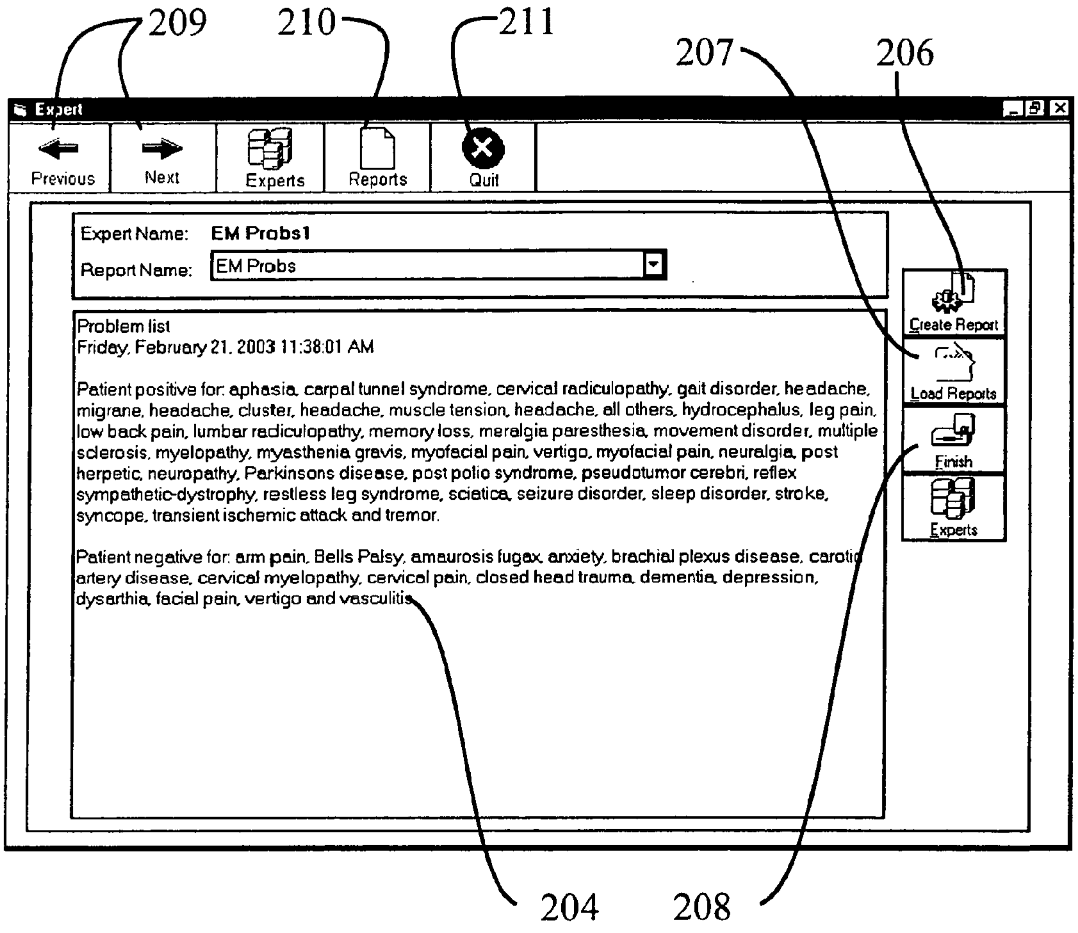
FIGS. 21-21A depict exemplary graphical forms of the user interface of the present invention, showing the presentation of a user report, as well as the navigation of a linked web-site.

Depending on the phrase type, the related information is retrieved from the report writing tables in the database 100 with the corresponding phrase identifier and loaded into a collection. Once all the report phrases are loaded into a collection, the report writing program of this invention iterates through these report phrases one by one, adding text to the report depending upon phrase type, as particularized above. Upon completing of program iteration through the report phrases, the compiled user report is loaded into a text box 204 for user viewing and, as desired, editing, at the user interface 200, such as shown in the exemplary graphical form of the interface of FIG. 21.

More particularly, and as described in further detail hereinbelow, the report writing function is accomplished by the engine 300, which employs the report writing tables of the database 100 to sequentially work through the rules thereof. The rules are processed in a procedural manner from beginning to end with only one route through, with predefined text from these tables being added to the report based upon the rules and the user responses given during an interrogation session, all as explained further herein.

Figure 17:
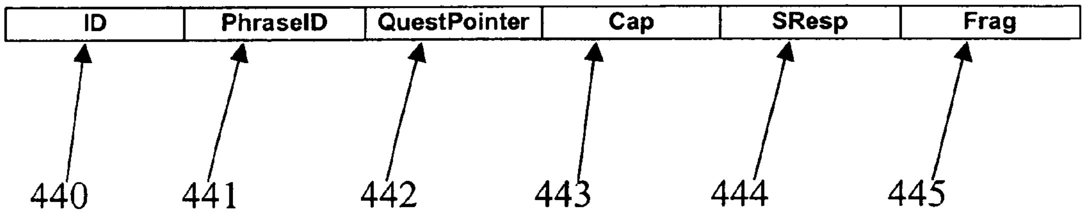
Figure 18:
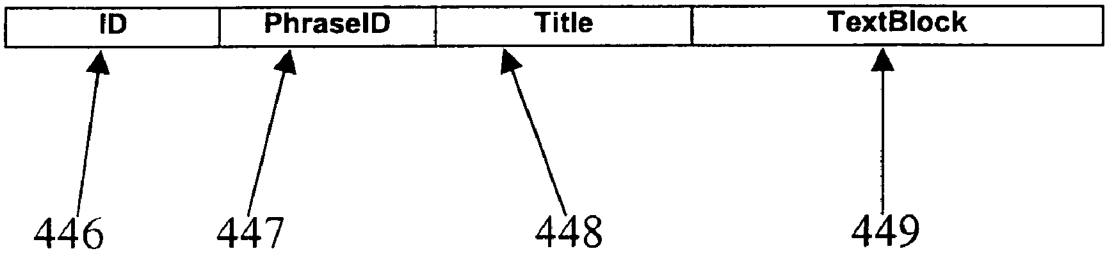
Figure 19:
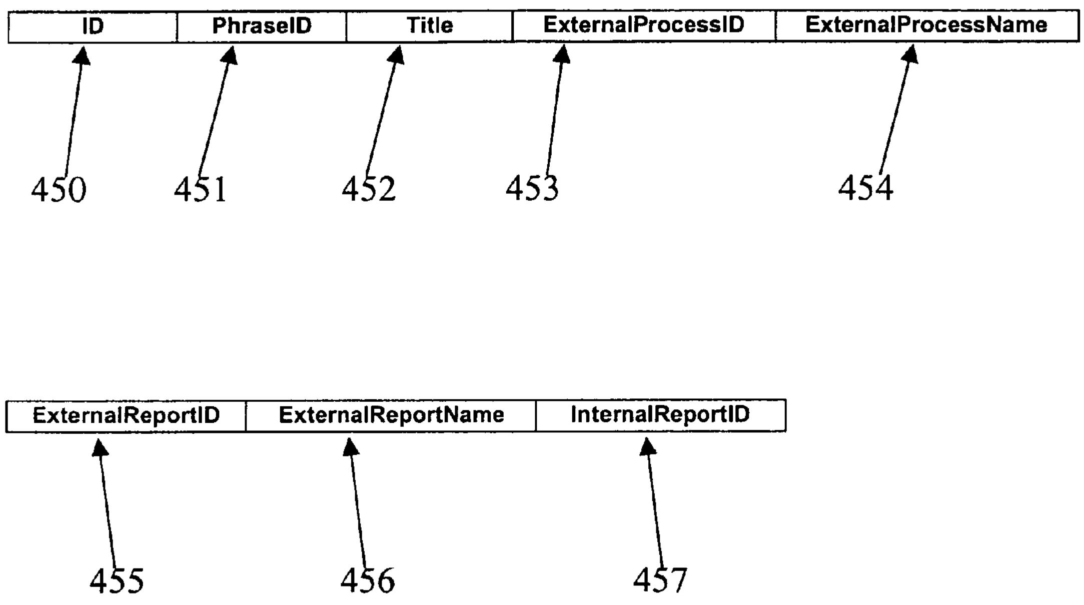
Figure 19A:
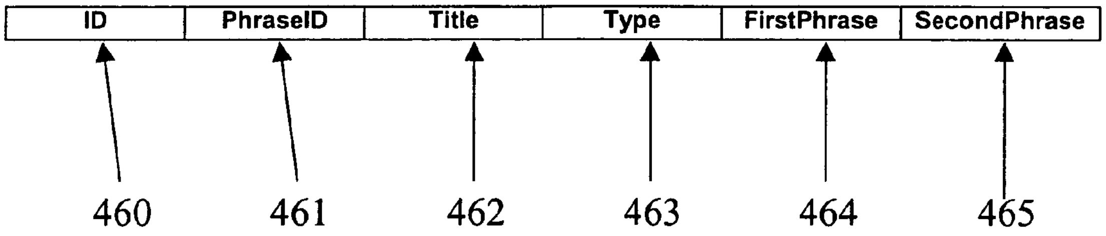
Figure 20:
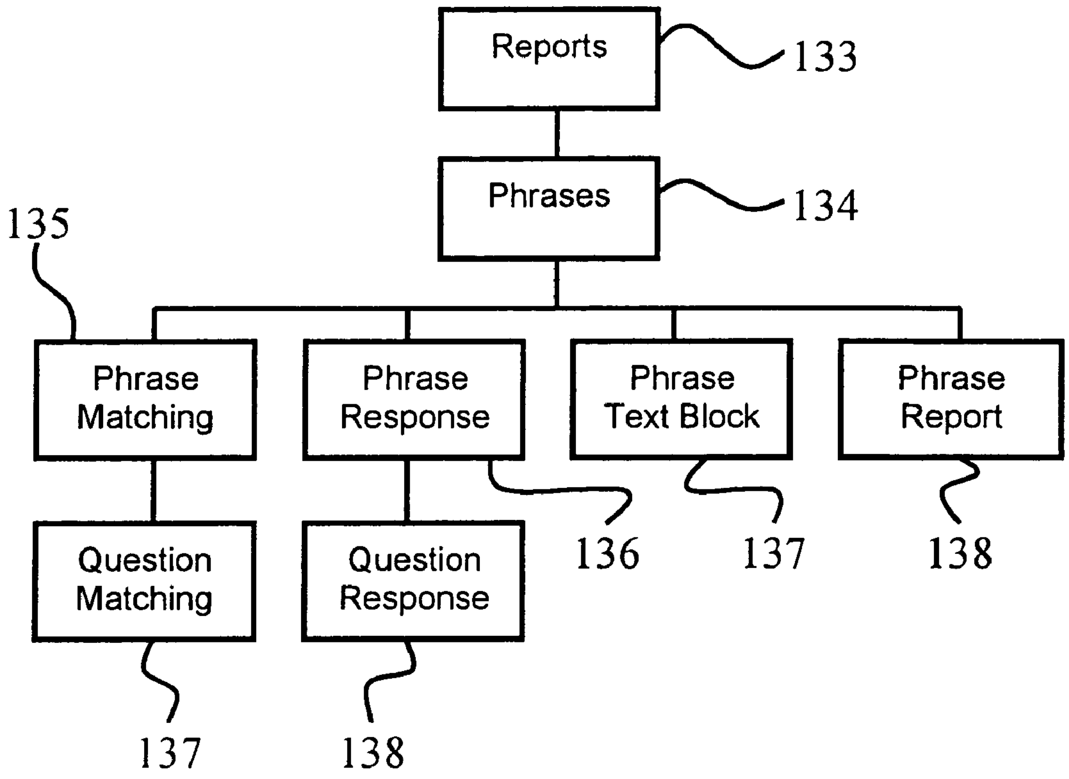
FIG. 20 diagrammatically illustrates the organizational hierarchy among the several database tables for defining the content and rules for generating user reports.

In the exemplary embodiment of the inventive software, the report writing tables of the database 100 comprise the main "Reports" table (FIG. 12), a "Phrases" table (FIG. 13), a "Phrase Matching" table (FIG. 14), a "Question Matching" table (FIG. 15), a "Phrase Response" table (FIG. 16), a "Question Response" table (FIG. 17), a "Phrase Text Block" table (FIG. 18), a "Phrase Report" table (FIG. 19), and a "PhraseScore" table (FIG. 19A). These several tables of the database 100 are interrelated in the following hierarchical manner, shown in FIG. 20: The main Reports table 133 links to the Phrases Table 134, which in turn links to each of the Phrase Matching Table 135, Phrase Response table 136, Phrase TextBlock table 137, and Phrase Report table 138. The Phrase Matching table 135 is, in turn, linked to the Question Matching table 139, and the Phrase Response table 136 is linked to the Question Response table 140. The organization of these tables is explained in further detail below.

Figure 7:
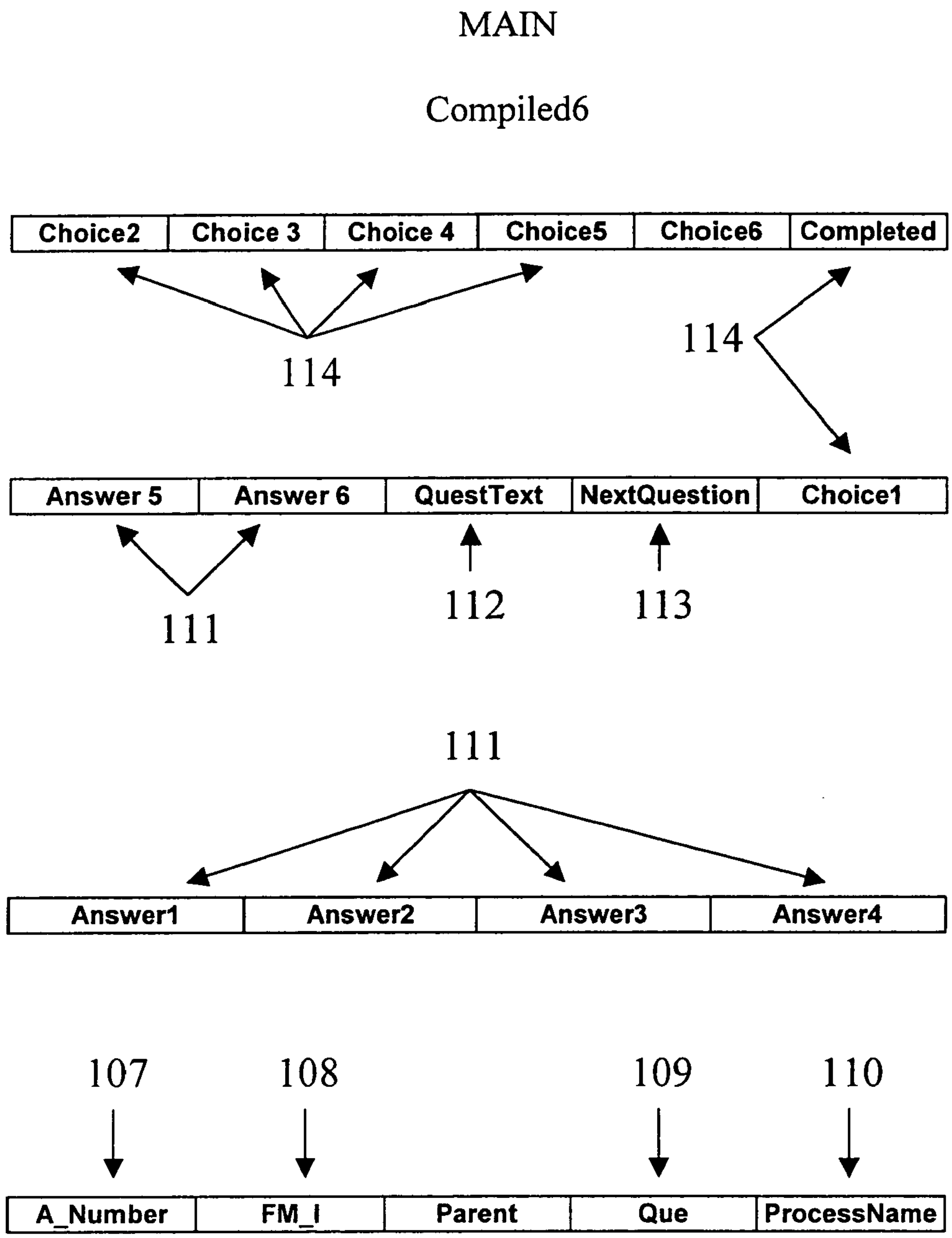
FIGS. 7-11A illustrate exemplary formats of database tables for defining and organizing question data.
Figure 8:
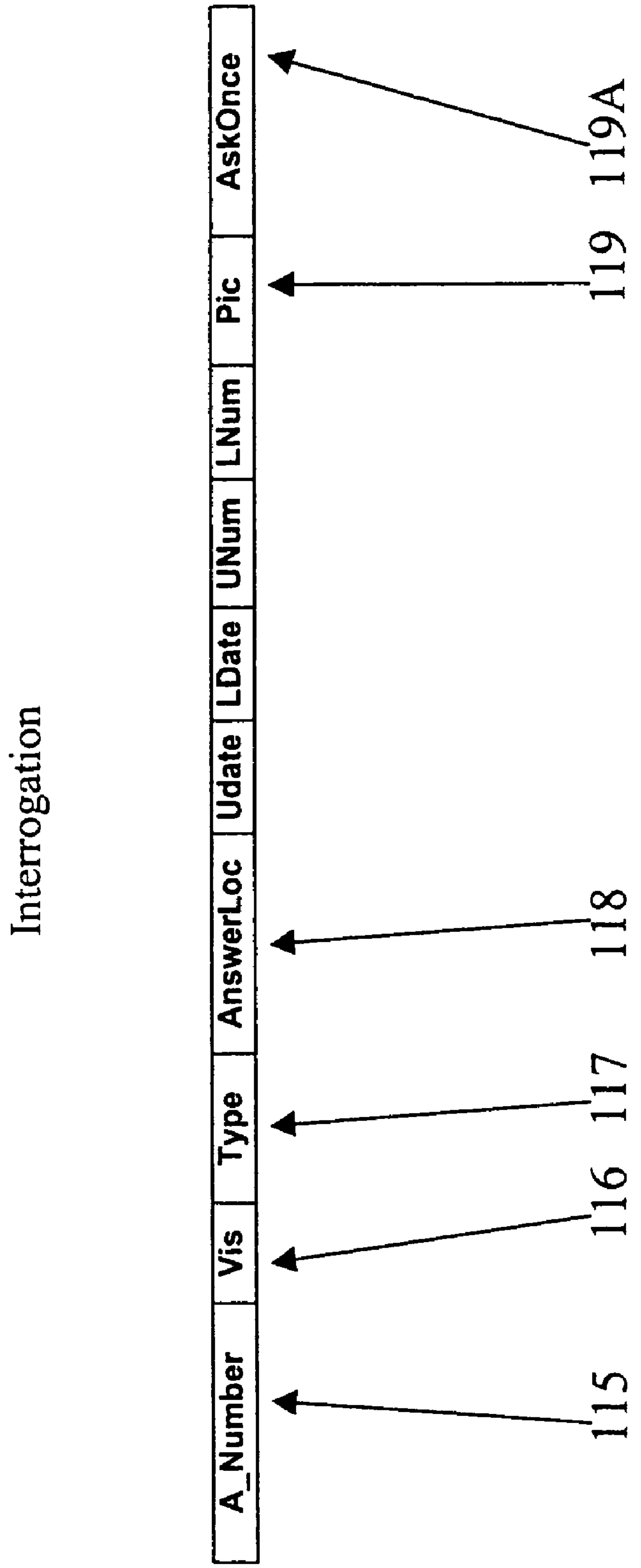
Figure 9:
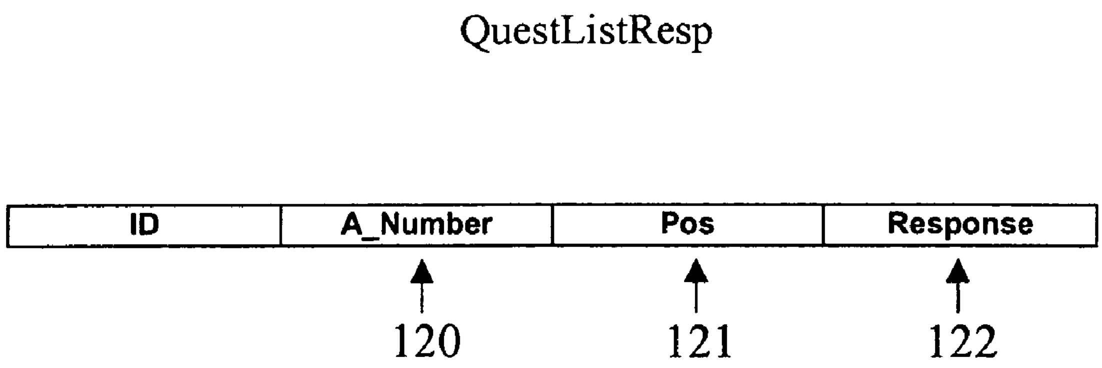
Figure 10:
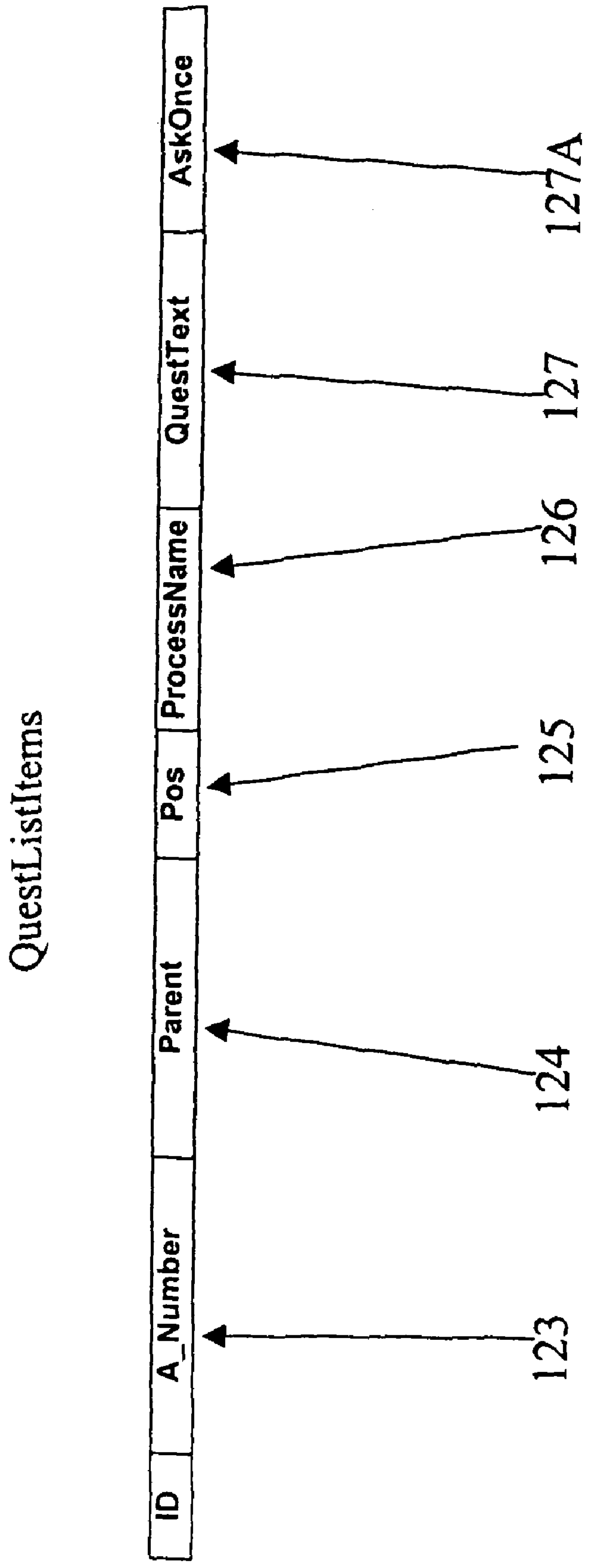
Figure 11:
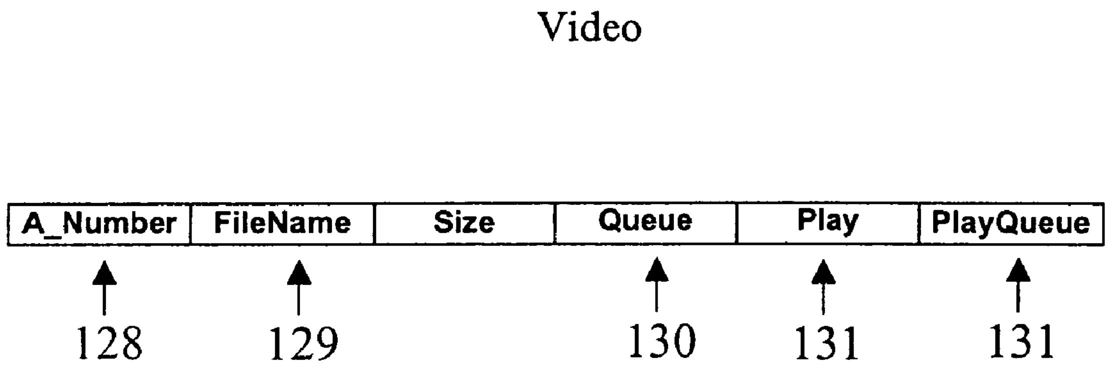
Figure 11A:
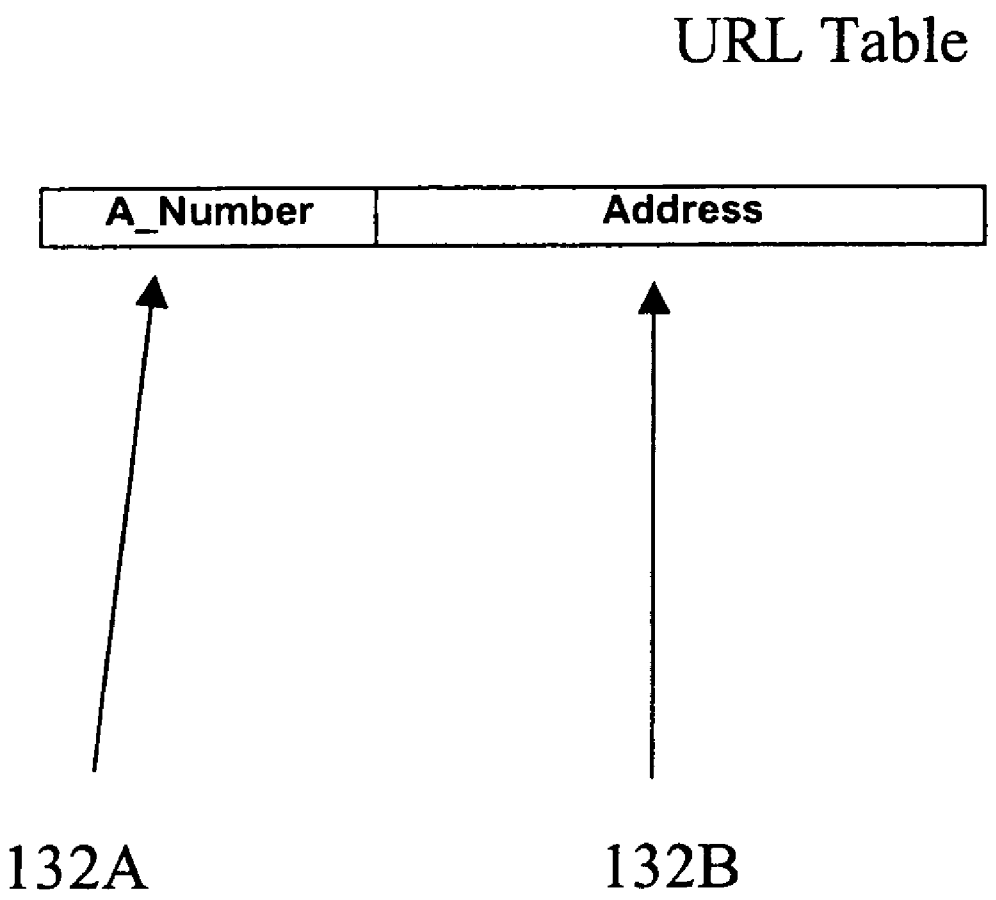

The main Reports table (FIG. 12) defines the possible reports to be constructed. The "ID" field 400 thereof is the unique identifier for each report which links to fields in related report writing tables of the database 100. The "Alias" field 401 is the name of the report for the user to select; the "ProcessID" field 402 and the "ProcessName" field 403 define links between the main Reports table and the Main Table (FIG. 7).

The "Phrases" table (FIG. 13) contains the order and types of phrases to be included in a report. The "ID" field 405 is a unique number by which to identify the individual records. The "ReportID" field 406 corresponds to the unique "ID" field 400 in the main Reports table, thus relating the two. That is, all records (i.e., phrases) in the "Phrases" table (FIG. 13) containing a value in the "ReportID" field 406 identical to a value in the "ID" field 400 of the "Reports" table (FIG. 12) are thus identified as belonging to the same report. The "Pos" field 407 signifies the order in which each phrase will be processed. Thus, for example, a phrase record having a value of "Pos=0" is processed first in the report-writing process, explained further herein. Finally, the "Type" field 408 determines the type of phrase, the related tables containing the phrase instructions, and a corresponding action to process. Possible phrase types, as previously discussed, include: PhraseMatching, PhraseTextBlock, PhraseResponse, PhraseReportModule, LineBreak, ParagraphBreak, PageBreak, SystemDate, SystemTime, SystemDateTime and Score. Of the foregoing, LineBreak, ParagraphBreak, PageBreak, SystemDate, SystemTime, and SystemDateTime simply add the corresponding type of phrase to the report without any additional operations.

Figure 13:
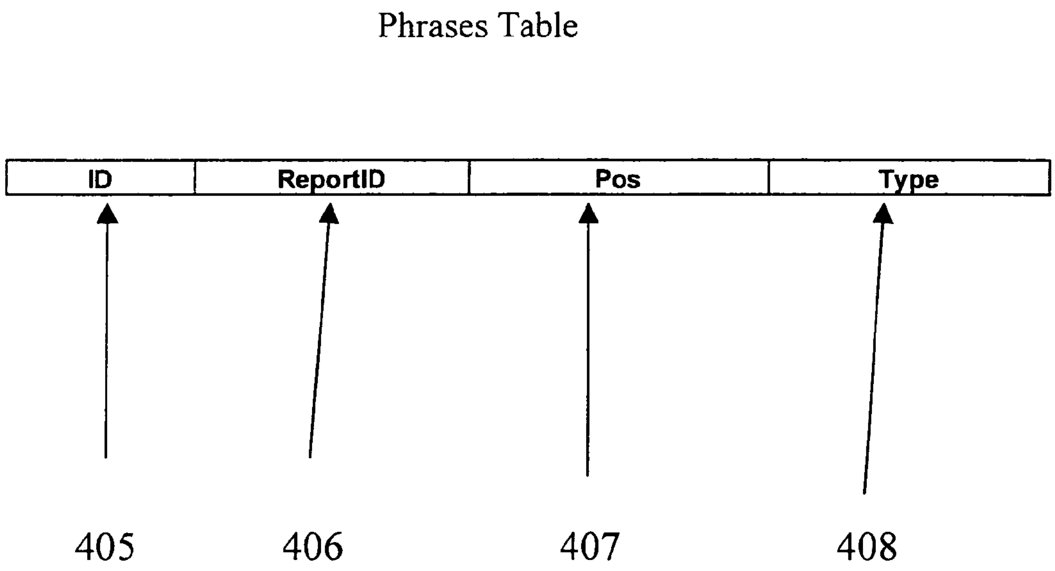

The "PhraseMatching" table (FIG. 14) contains an unique "ID" field 410 for referencing. The "PhraseID" field 411 links to the "ID" field 405 of the "Phrases" table (FIG. 13). "Title" 412 is the title of the PhraseMatching record which is used by the developer when creating phrases within a report. That is, the "title" record is employed as a device by which a database developer can quickly determine which phrase records appear in which order. The "title" field thus does not comprise part of the final report. The remaining fields are used based upon the number of matching answers, as described below.

Figure 14:
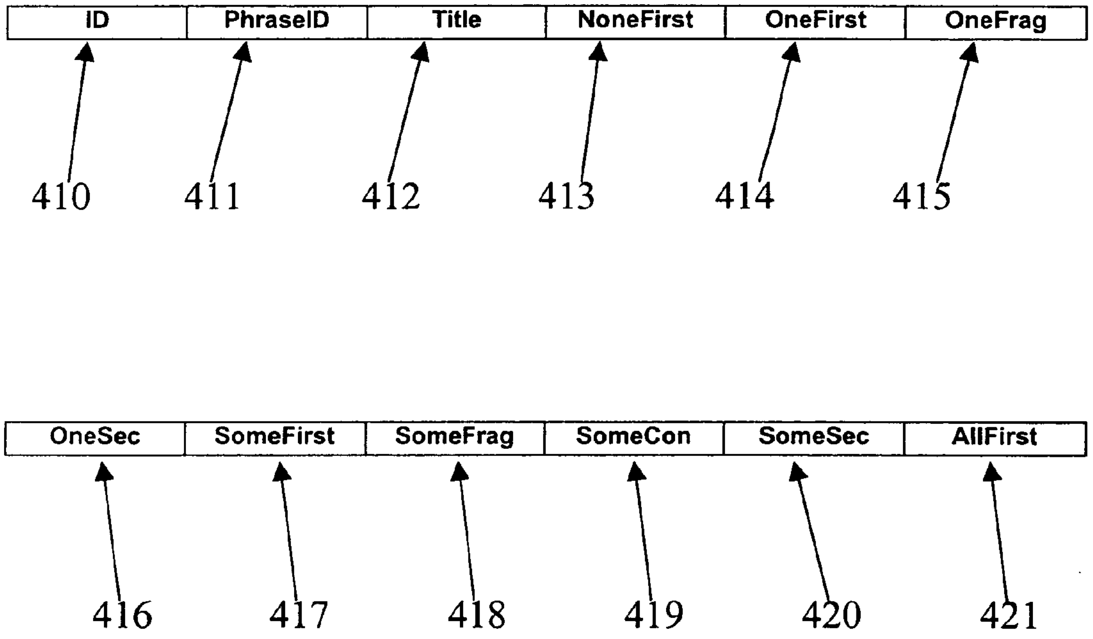

Still referring to FIG. 14, phrases of the "PhraseMatching" type can add at least two text fragments to a phrase in a report. If no answers match the predetermined desired response, the text in the "NoneFirst" field 413 is added to the phrase. If one answer matches the predetermined desired response, the text from the "OneFirst" field 414 is added to the phrase. If more than one, but not all, of the responses match the predetermined desired response, the text in the "SomeFirst" field 417 is added to the phrase. If all the responses match the predetermined desired response, the text contained in the "AllFirst" field 421 is added to the phrase. If one or more, but not all, responses match the predetermined desired response, the text contained in either the "OneSec" 416 or "SomeSec" 420 fields is added to the phrase. More particularly, the text in the "OneSec" field 416 is added if one match is found, while the text in the "SomeSec" field 420 is added if more than one, but not all, responses match the predetermined desired response. When the text in the "SomeSec" field 420 is used, the text in the "SomeCon" field 419 is also added as a connector between the two phrases. The "OneFrag" 415 and "SomeFrag" fields 418 contain further values determinative of whether or not the user's response is added to the phrase. A positive value in the "One Frag" field 415 instructs the report writer to insert the user's response between the "OneFirst" field 414 and the "OneSec" field 416. Similarly, a positive value in the "SomeFrag" field 418 instructs the report writer to insert the user's responses, separated by the "SomeCon" 419 field, between the "SomeFirst" field 417 and "SomeSec" fields 420.

The "QuestionMatching" table (FIG. 15) determines which question to find the answer for. The "ID" 425 is the unique identifier for referencing. The "PhraseID" field 426 corresponds to the "ID" field 410 of the "PhraseMatching" table. The "QuestPointer" 427 field contains the corresponding A_Number 107 from the Main Table (FIG. 7). This "QuestPointer" 427 allows matching the question to the users answer by use of the QuestPointer 427 which is the A_Number 107 of the interrogation section. The "Cap" field 428 is the caption of the question. The "SResp" field 429 contains the sought after or desired response. The "Frag" field 430 contains the fragment to be appended to a report if the user's actual answer matches the predetermined desired response in the "SResp" field 429.

Figure 15:
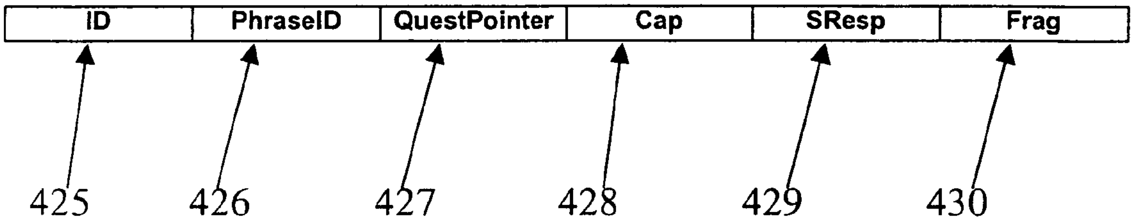

The "PhraseMatching" table (FIG. 14) functions in cooperation with the "QuestionMatching" table (FIG. 15) to identify the responses to the questions linked to the phrases in "PhraseMatching" (FIG. 14), exemplified as follows: A "PhraseMatching" (FIG. 14) entry is created to build a phrase based upon the responses to the questions: "Are you cold?", "Is it cold outside?", "Is it cold inside?". Each of the three questions can be answered "Yes" or "No", with the predetermined desired response being "Yes". The entry in "PhraseMatching" (FIG. 14) establishes the rules for how a phrase in a report is constructed based upon the user's actual interrogation response to the aforementioned questions when compared against the predetermined desired response. To that end, the "ID" 410 field in "PhraseMatching" table (FIG. 14) links to the "PhraseID" 416 field in "QuestionMatching" table (FIG. 15), which lists the questions in the "QuestPointer" 427 field to identify the predetermined desired response. The "SResp" 429 field in the "QuestionMatching" table (FIG. 15) contains the predetermined desired response ("Yes" to all 3 questions for this example). If none of the user's responses matched the predetermined desired response (e.g. the user answerd "No" to all 3 questions), the text in the "NoneFirst" 413 field would be appended to the report. If all the user responses matched the predetermined desired response, the text in the "AllFirst" 421 field would complete the phrase being appended to the report. If one response matched the predetermined desired response, the text in the "OneFirst" 414 field would precede the user's response (if the "OneFrag" 415 field contains a "True" value) and the text in the "OneSec" 416 field would follow the user's response, which itself would come from the "Frag" field 430 of the "QuestionMatching" table (FIG. 15). For example, if the user responded "Yes" to "Are you Cold?" question and "No" to the other two questions, the phrase constructed would consist of the "OneFirst" value 414 followed by the "Frag" value 430 (assuming "OneFrag" 415 is true), followed by the "OneSec" value 416. (FIG. 15) Similarly, if more than one, but not all of, a user's responses in this example matched the predetermined desired response (e.g., 2 out of 3 matches), the text in the "SomeFirst" 417 field would precede the user response (if the "SomeFrag" 418 field contains a "True" value) and the text in the "SomeSec" 420 field would follow the user's response. The user responses would then be separated with the value in the "SomeCon" 419 field.

Figure 16:
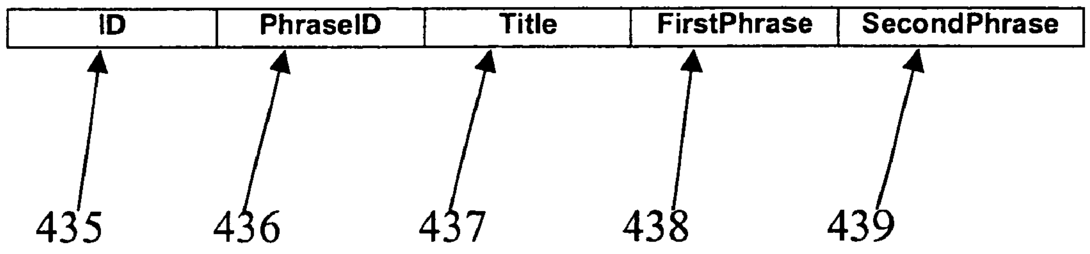

Turning now to FIG. 16, the "PhraseResponse" table contains an unique "ID" field 435 for reference purposes in developing the table. The "PhraseID" field 436 links to the "ID" field 405 of the Phrases table (FIG. 13). The "Title" field 437 contains the title of the PhraseResponse item, which title has a purpose comparable to that of the "Title" field 412 in the "PhraseMatching" table (FIG. 14). The "FirstPhrase" 438 and "SecondPhrase" fields 439 contain phrases to surround a user's response in a report. For example, the "FirstPhrase" field might contain the text "The patient currently consumes", while the "SecondPhrase" field might contain the text "caffeine drinks per day". If the user's relevant interrogatory answer is the number "4," the entire phrase generated in the resulting report would thus be: "The patient currently consumes 4 caffeine drinks per day".

The "QuestionResponse" table (FIG. 17) determines the question to find the matching response for. The "ID" 440 is the unique identifier for referencing. The "PhraseID" 441 corresponds to the "ID" field 435 of the "PhraseResponse" table. The "QuestPointer" field 442 contains the corresponding A_Number 107 from the "Main Table" (FIG. 7). This "QuestPointer" 442 allows matching the question to the users answer by use of the QuestPointer 442 which is the A_Number 107. The "Cap" field 443 is the caption of the question. The "SResp" field 444 contains the sought after or desired response. The "Frag" field 445 contains the fragment to append to the report if the actual response matches the desired response in "SResp" 444.

The "PhraseTextBlock" table (FIG. 18) contains blocks of text to add as phrases to the report. The "ID" field 446 is the unique identifier. The "PhraseID" field 447 corresponds to the "ID" field 405 of the Phrases table (FIG. 13). The "Title" field 448 contains the title of the PhraseTextBlock. The "TextBlock" field 449 contains the block of text actually to be appended to the report.

The "PhraseReport" table (FIG. 19) allows adding existing report modules to the report being constructed. The "ID" field 450 is the unique identifier for referencing the individual records. The "PhraseID" field 451 corresponds to the unique "ID" field 405 in the Phrases table. The "Title" field 452 contains the title of the report module. The "ExternalProcessID" 453, "ExternalProcessName"454, "ExternalReportID" 455 and "ExternalReportName" 456 fields identify report modules contained in an external database. The "InternalReportID" field 457 links to the "ReportID" field 406 of the Phrases table, thus matching all phrases contained in the selected PhraseReportModule.

The "PhraseScore" table (FIG. 19A) is used to append the results of a test to a report. The "ID" field 460 is a unique identifier for reference purposes. The "PhraseID" 461 corresponds to the "ID" field 405 in the Phrases table (FIG. 13). The "Title" field 462 contains the title of the phrase score. The "Type" field 463 determines which record to process while constructing the report. The "FirstPhrase" 464 and "SecondPhrase" 465 fields are similar to the FirstPhrase and SecondPhrase of the PhraseResponse table in that they define text surrounding a user's actual test score. For example, the FirstPhrase field might contain the text, "You scored," while the SecondPhrase field might contain the text, "questions correctly, for a percentage of". If the users correct answers numbered 87 out of 100 questions, the PhraseScore table would direct the addition of the complete text, "You scored 87 questions correctly, for a percentage of 87%," to the report being constructed.

User Interface

Referring again to FIG. 1, in order to facilitate interaction between a user and the other elements of the invention, the inventive system and program provides a user interface 200. Broadly speaking, the interface 200 is the external connection to the other two components, that is, the engine 300 and database 100, providing for example a graphical interface (GUI) for user input and displaying information to the user and for facilitating input of user answers. The interface 200 serves to obtain, display and exchange information between the user, the engine 300, and the database 100, and to provide one possible output for a user report generated in accordance with the present invention. The interface 200 may be embodied in numerous conventional devices, including, without limitation, workstation computers comprising video monitors, hand-held computing platforms, etc.

More particularly, the interface 200, using the engine 300 as an intermediary (as described further herein), displays information from the database 100 in the form of one or more questions, any graphic files, video processes, web browser processes, etc., and then waits for the user to interact. User entry of a response may be facilitated through a human-computer interface device, such as a keyboard, voice-recognition means, touch-screen interface, alphanumeric keypad, computer mouse, etc.

In the exemplary embodiment of the present invention, the user interface program software is written in the VISUAL BASIC programming language for usage in a local area network, and the source code therefore, contained in a computer program listing appendix identified hereinabove, is incorporated herein by reference in its entirety. In alternate embodiment, according to which the invention is operable over a global network, the user interface program software is written in the ASP language. Of course, other programming languages for the creating the interface are possible, as known to those skilled in the art, the particular programming language employed not intended to be limiting of the instant invention.

Figure 21A:
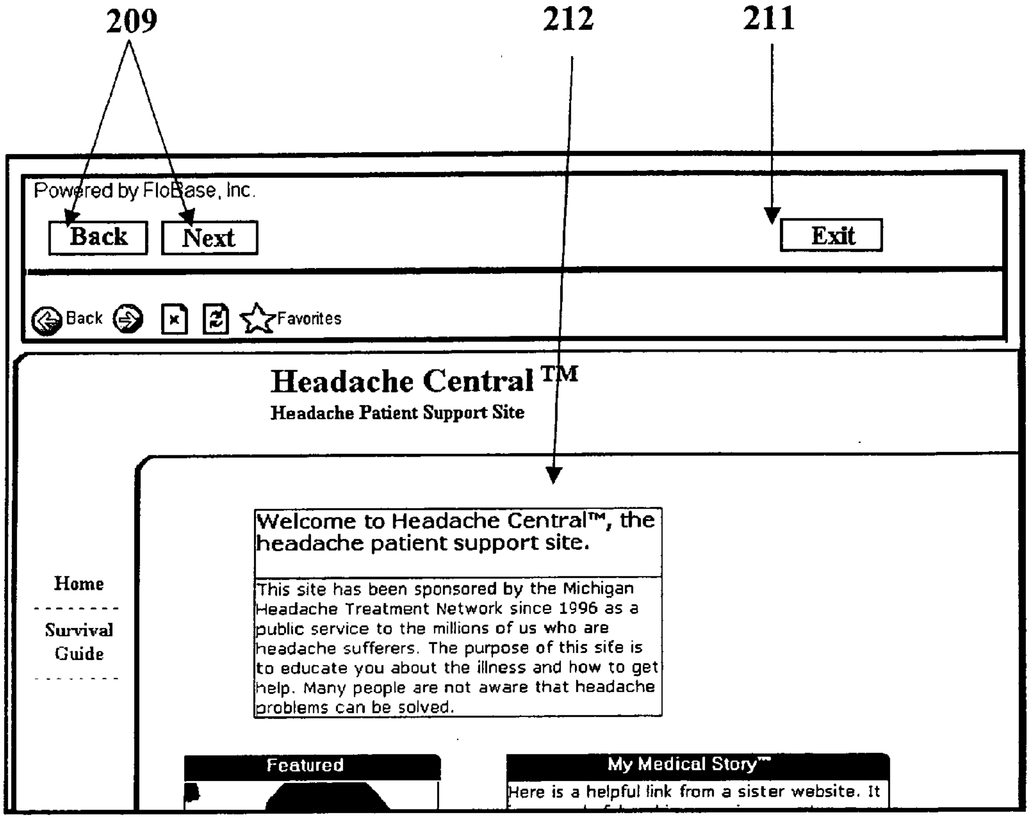

Exemplary graphical forms of the user interface 200 are shown in FIGS. 3-5A, 21 and 21A, and will be seen therefrom to comprise areas 205 for presentation of questions and/or instruction, as well as for the display of answers. Additionally, the interface may incorporate conventional web browser software for the display of a linked web-site 212 as shown in FIG. 21A. The exemplary interface further includes a reporting screen (FIG. 21) for displaying a user report in a text box 204, the reporting screen including, as desired, tabs for generating the report 206, loading other reports 207, and saving reports 208. Further tabs apparent in each screen of the exemplary embodiment of FIGS. 3-5A 21 and 21A include navigational tabs 209 facilitating movement backwards or forwards through the interrogation process screens, a reports tab 210 for advancing to the reporting screen, and a "Quit" or "Exit" tab 211 for terminating the interrogation session.

Engine

Referring again to FIG. 1, the engine 300 is a run-time program providing the functional link between the database 100 and the user interface 200. The engine 300 has two main functions: First, to navigate one of the plurality of possible logical interrogatory paths through the database 100 as determined by a user's answers to questions presented; and, second, to generate a result, including, but not limited to, the generation of a user report via the report writing rules, presentation of a tailored video, tailored web-site navigation, etc.

Figure 22:
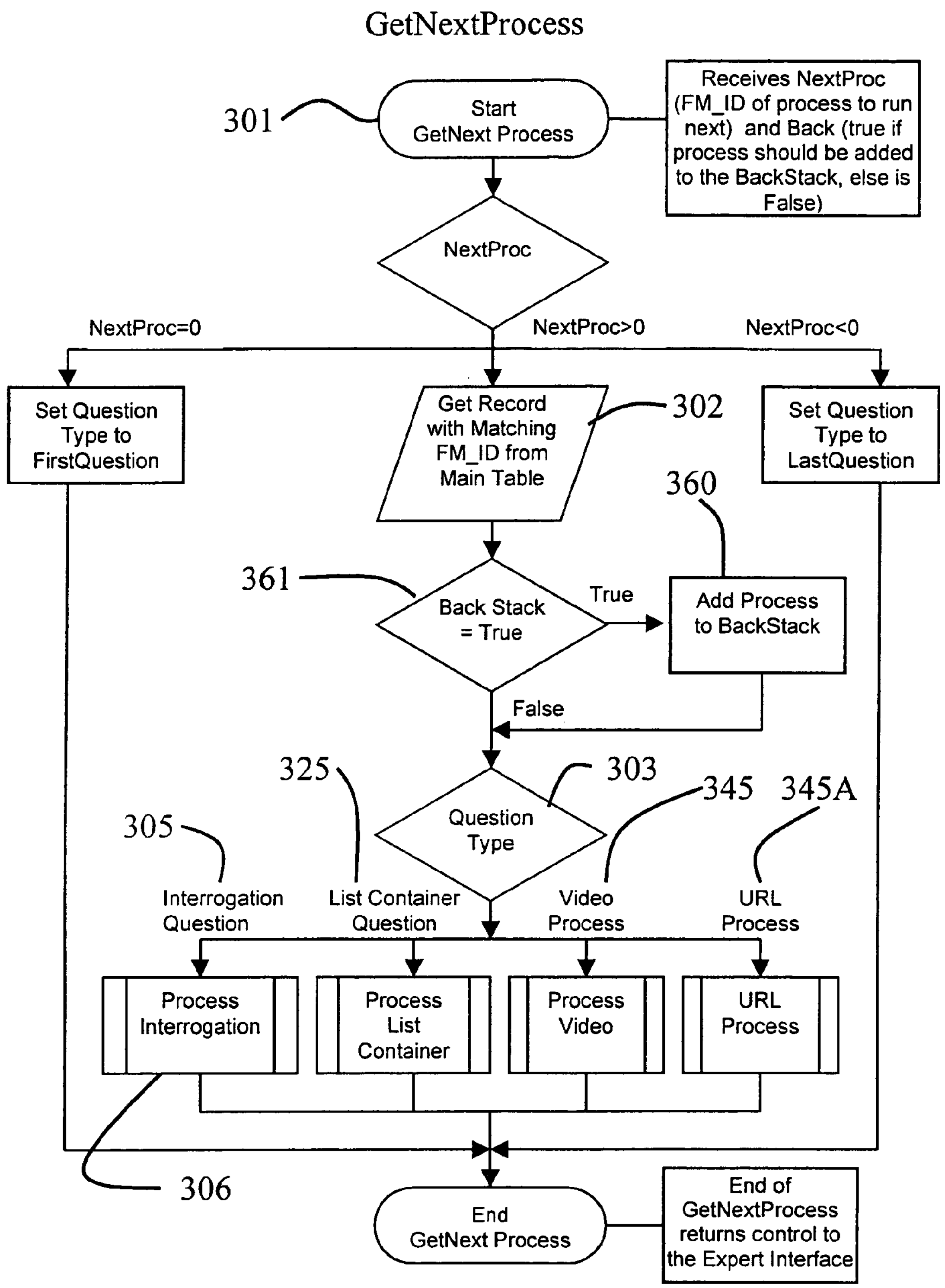
FIG. 22 is a logic flowchart depicting the operation of moving between questions in an interrogatory session of the present invention.

More specifically, and as shown in overview in FIG. 22, the engine 300 contains algorithms for determining the next question or other process from the database 100 to execute, and further populates the necessary objects and collections from the database 100 dependant upon the type of question or other process. These algorithms are applied to the questions and other processes in the database 100 to determine, for instance, which question to ask next, whether to build a video storage queue based upon the current user's responses to the questions, whether to build a storage queue of URL addresses, etc. These objects and collections are then displayed to the user through the user interface 200, thereby permitting the user to perform an action such as viewing video, answering questions, navigating web pages, or reading displayed messages.

In the exemplary embodiment, the user interface 200 uses the engine 300, in the form of a Dynamic Link Library, or "DLL" (imported as a COM object for Internet use), to connect to the database 100 to determine a user's flow through the processes in that database 100 based upon the user's responses to questions presented in an interrogation session. In other words, the engine 300 functions to interact with the database 100 to determine which questions will be displayed at the user interface 200, and when and where to branch along a given interrogatory path based upon the user's answers to these questions.

In the exemplary embodiment of the present invention, the engine program software is written in the VISUAL BASIC programming language, and the source code therefor, contained in a computer program listing appendix identified hereinabove, is incorporated herein by reference in its entirety. Of course, other programming languages for the creating the interface are possible, as known to those skilled in the art, the particular programming language employed not intended to be limiting of the instant invention.

Operation

Still referring to FIG. 22, the foregoing elements of the present invention will be better understood in the context of their operational interrelation, whereby the method of this invention may likewise be understood. The interrogation process may be seen to generally comprise, in operation, the engine 300 facilitated display at the user interface 200 of predefined questions and answers, and the engine 300 facilitated navigation through one of the plurality of possible logical paths of the database 100 as dictated by the user's answers to the questions presented.

It is of course contemplated that while the interrogation of a user may take place over the course of a single, continuous session, the interrogation may likewise be broken up into discrete segments. Thus, for instance, a user may answer one or more questions during a first interrogation session, those answers may be stored, and the interrogation session continued at a least a second, later time, using the stored user-answers from the previous interrogation session to resume the interrogation session at the precise point where the previous session was discontinued.

More particularly, the present invention takes the process designated as the starting process (i.e., the first question) in the database 100 and displays it according to its properties. From then on, the interrogatory path followed will vary with the responses of the user until an end point is reached. This interrogatory path is defined by questions and/or other processes in the database, which will identify other questions and/or other processes, some of which will be displayed at the interface 200 because they need user input, and others of which will not need user input from the interface but which will need information from the file of stored answers given by the user in previously asked questions (i.e., invisible questions). Upon reaching an ending question in the database 100, the engine 300 can return a result based upon user responses, for instance in the form of a text report using the report writing tables, a tailored video, tailored web-site navigation, etc.

Still more specifically, the interrogation process proceeds as follows: Upon invoking an interrogation session, i.e., by loading the inventive program, the run-time engine 300 selects the Main Table (FIG. 7) from the database 100 and loads the starting process (i.e., the first question) into its objects and collections using the so-called "GetFirstProcess" procedure of the engine 300 as explained below. Based upon the type of process (e.g., Interrogatory, List Container, Video, URL/Web Process etc.), the appropriate objects and collections are populated from the corresponding table or tables in the database 100, as directed by the linking information in the Main Table, and thereafter displayed at the user interface 200, which displays the question(s) and/or other processes based upon the details present in the engine's 300 objects, and then waits for the user to respond.

Upon selecting which table in the database 100 to run, the engine 300 establishes the connection to the database 100 and creates an empty set of answers and populates its objects with the first process. The objects and collections to populate are, as indicated, based upon the process type (e.g., Interrogatory question, List Container question, Video process, URL/Web process etc.).

After answering the question, reading the text information, viewing any associated video segment, or navigating one or more associated web pages through an internet browser, as applicable, the user selects one of the "Next" or "Back" navigational tabs 209 (FIGS. 3-5A, 21, 21A), which instruction directs the information entered by the user at the interface 200 to the engine 300. Specifically, the users' response is sent to the engine 300 and temporarily stored in an answer file in the engine 300, along with the corresponding question identifier, or "A_Number," for the question being answered. The engine 300 then determines the next process to run from the database 100, based upon the information contained in the appropriate table for the current process and the users' response, again by calling the "GetNextProcess" procedure described herein.

In general terms, the next process to run is determined by either the next question or process defined in the Main Table (meaning no branching logic is required), or the question or other process number to branch to, if required from the users' response. Thus, if the user chooses a response that has a corresponding branch in the form of a question or other process identification (i.e., FM_ID) number, this process number is then sent to the engine 300 as defining the next process to run. If an answer with no specified branching is selected by the user, or the current process type does not permit branching, the next logical process is sent to the engine 300 as the next process to run. In other words, the engine 300 goes from process to process, seeking information from the existing collection of answers or "asking" the user for a new answer to a question and continuing through the process identifiers (FM_ID's) until reaching a termination point.

Referring again to FIG. 2, the operation of moving between processes may be better understood by means of the exemplary hierarchy therein depicted. Specifically, a user selecting "yes" in answer to the question "have you ever used tobacco?" 102 would result in selection of the next logical question defined in the hierarchy; i.e., "what type of tobacco?"104. The user's selected answer to this question, however, defines a branching point in the logical hierarchy of the questions, such that a user's selecting "cigarettes" as his response to this question would result in movement to the relevant questions respecting cigarettes, whereas a user's instead selecting "cigars" or "pipes" as his response would result in movement to the relevant questions respecting one of these other tobacco types, as appropriate.

As indicated, a user's responses may be temporarily or permanently stored in an answer file in the engine 300, to be retrieved therefrom to determine branching, as well as to prevent the same question from being asked twice; e.g., to answer invisible questions, and/or to generate a user report at the end of an interrogation session.

The engine 300 also tracks the current user's interrogatory path through the database 100 during a given interrogation session, allowing the user to back-track to review images, text, web pages, videos, or to review and/or change answers to questions previously presented, thereby allowing for the selection of a different answer which could, in turn, dictate an alteration in the logical interrogatory path through the database.

Referring now to FIG. 22, upon answering the question(s) and clicking on the "Next" navigational tab 209 at the interface 200 (the interface preferably permits this operation only when all pending questions have been answered), the "GetNextProcess" is called (i.e., started) 301 from the interface 200, thereby passing off the next process to run. If the current question is of a multiple-choice type, with the answer defining a branching point in the logical interrogatory path through the database 100, the engine 300 will load that process from the database 100 next. Otherwise, the next logical question (i.e., as defined in the "NextQuestion" field of the Main Table) will be displayed at the user interface 200.

The next logical process to run is determined by the received "NextProc" parameter passed to the "GetNextProcess" procedure (FIG. 22). The value in the "NextProc" parameter is determined based upon the rules of the logic engine 300 as described earlier and the user response to the question being asked, or questions asked previously during the interrogation session. In the exemplary program, the "NextProc" can contain one of three values: negative one (−1), zero (0), or a value greater than zero (>0). If "NextProc=−1" (negative one), the interrogatory path has reached an end point and a desired result, such as the report writing, is generated. "NextProc=0" (zero) occurs when the user is back-tracking through the logic thread and has reached the starting point or first question. Finally, a "NextProc" greater than 0 (zero) signifies the next logical process to execute 302. More particularly, the value of any "NextProc" greater than 0 will relate to the "FM_ID" field 108 in the "MainTable" (FIG. 7), the corresponding record information of which will then be loaded into the classes of the engine 300 as the current process and displayed thereafter displayed at the user interface 200.

Still referring to FIG. 22, the"GetNextProcess" retrieves 302 the record with a matching "FM_ID" value from the "Main Table" (FIG. 7) in the database 100. A decision 303 is then made as to which type of question or process is represented by the record. In the exemplary form of the present invention, the possibilities for a process type run under this function are: (1) Interrogation 305; (2) List Container 325; (3) Video 345; and (4) URL Web Pages 345A.

Figure 23:
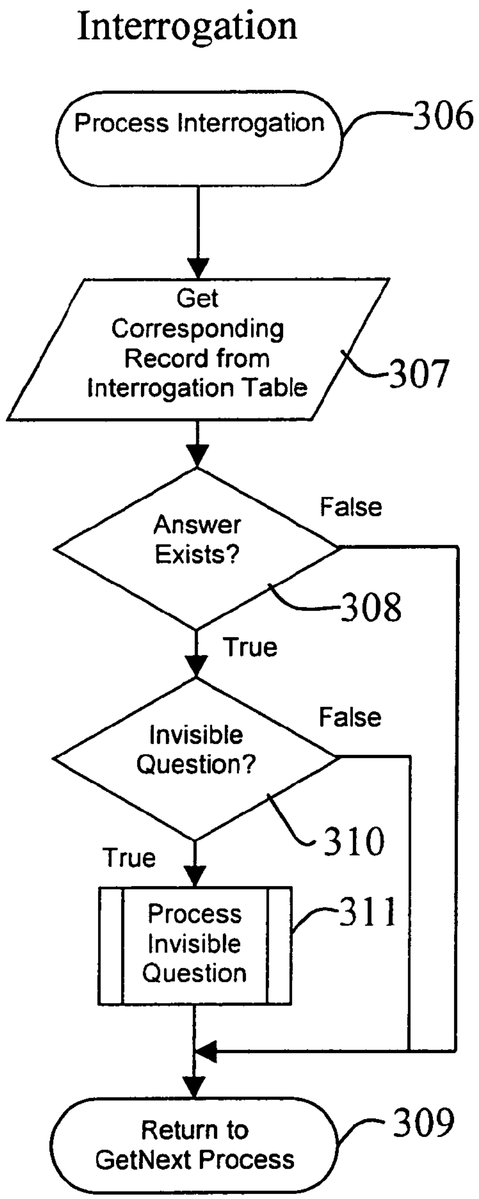
FIG. 23 is a logic flowchart for the function of processing Interrogation-type questions in this invention.

Referring also to FIG. 23, interrogation type processes call the "ProcessInterrogation" process 306, according to which a related Interrogation record is loaded 307 into the interrogation object of the engine 300. If the question contains a negative value in the "AskOnce" property, the engine 300 checks if the question has previously been asked and answered by the "AnswerExists" function 308. More specifically, the "AnswerExists" function checks the current question against the previously recorded user answers in the answer file, returning "True" if the question and answer exist in the answers collection, returning "False" if the question has not been asked and/or answered. If the question has not been asked, the "ProcessInterrogation" process returns to the "GetNextProcess" 309, whereupon the unasked question is displayed at the user interface 200 for the user to answer. If the answer does exist (i.e., "AnswerExists=True"), the engine 300 uses this stored answer to determine the next logical process in the database. If, on the other hand, "AskOnce" contains a positive value, the engine will display the question without checking the Answers Location and further will replace any existence of this question with the new answer in the Answer Location collection. Any future branching, whether it be the current process or invisible questions referencing the question, will be based upon this new answer.

If the question has been asked and the answer exists in the answers collection, the next process depends upon whether the question is of the visible or invisible type 310. If the question is visible ("Invisible Question=False"), the "ProcessInterrogation" process returns to the "GetNextProcess" 309, which passes the next logical process. If the question is Invisible ("Invisible Question=True"), the "ProcessInvisibleQuestion" process 311 is invoked. The "ProcessInterrogation" process then returns to the "GetNextProcess" 309, which passes the next visible question to the user interface 200.

Figure 24:
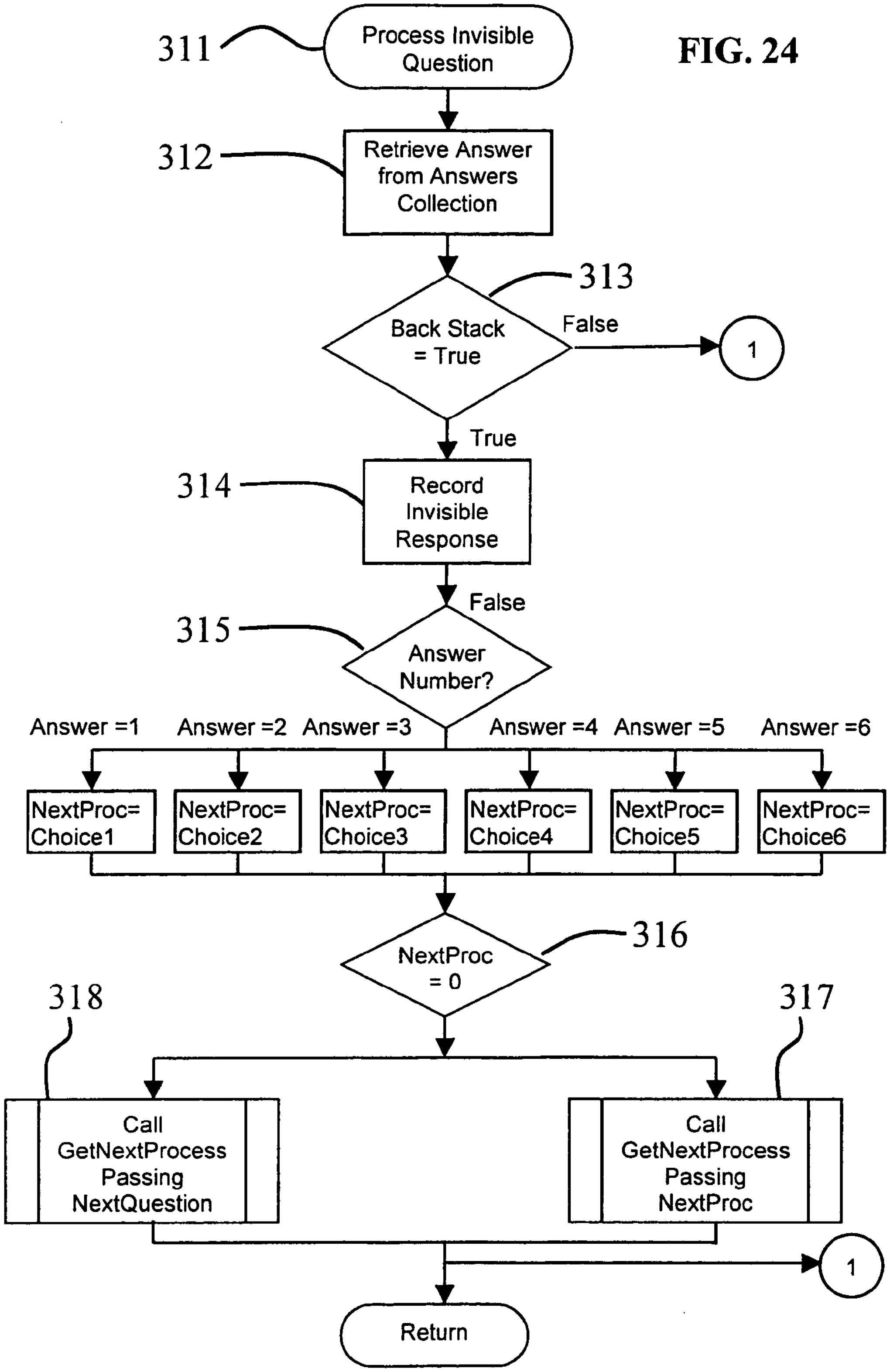
FIG. 24 is a logic flowchart for the function of processing Invisible-type questions in this invention.

Referring now to FIG. 24, the "ProcessInvisibleQuestion" process 311 retrieves the user's answers from the answer file 312. Using the question "A_Number" for the Invisible question, the process determines 313 if the answer to the question has already been given ("Answer Found=True") or not ("Answer Found=False"). If the answer has not yet been given, the process returns to the "GetNextProcess," which passes the Next logical Question to the user interface with no branching occurring. If the answer is found, it is recorded in the user answer file as a response to the Invisible question 314. The next step in this process is a determination 315 of the answer number to which the recorded answer corresponds, if any, which determination dictates whether the next question presented to the user at the user interface will be a next logical process or a branching process. More particularly, the process queries the database 100 for possible correspondence between the Answer and Choice fields in the relevant table as described above (e.g., "Answer Number=1; then NextProc=Choice 1"). The process then determines whether or not branching in the interrogatory path is required by querying the "NextProcess" for correspondence to a predefined Choice 316. If the recorded answer corresponds to a predefined Choice defining a branching process ("NextProcess=0=False"), the "GetNextProcess" passes the value in the corresponding Choice field as the next process to display at the user interface 317. If the recorded answer does not correspond to a predefined Choice defining a branching process ("NextProcess=0=True"), the "GetNextProcess" passes the next question to the user interface 318.

Figure 25:
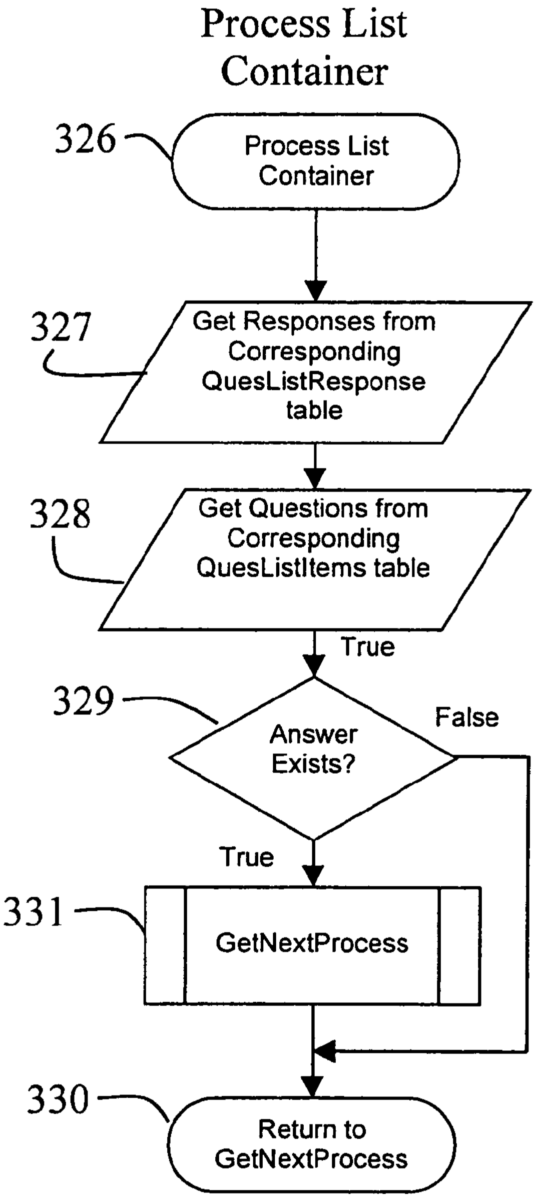
FIG. 25 is a logic flowchart for the function of processing List Container-type questions in the program of this invention.

Referring to FIGS. 22 and 25, the result of the "GetNextProcess" for List Container type questions is more particularly explained. Specifically, the "ProcessListContainer" function 326 gets responses 327 and questions 328 in the database 100 from the corresponding "QuestionListResponses" and "QuestionListItems" tables, respectively, described above. As previously, the engine 300 then checks if the questions have previously been asked and answered, via the "AnswerExists" function 329. The "AnswerExists" function 329 checks the current questions against the previously recorded user answers in the answer file, returning "True" if the questions and answers exist in the answers collection, or returning "False" if the questions have not been asked and/or answered. If the questions have not been asked the process returns to the "GetNextProcess" 330. If the answers do exist, however, the next logical process is executed via the "GetNextProcess" function 331.

Figure 26:
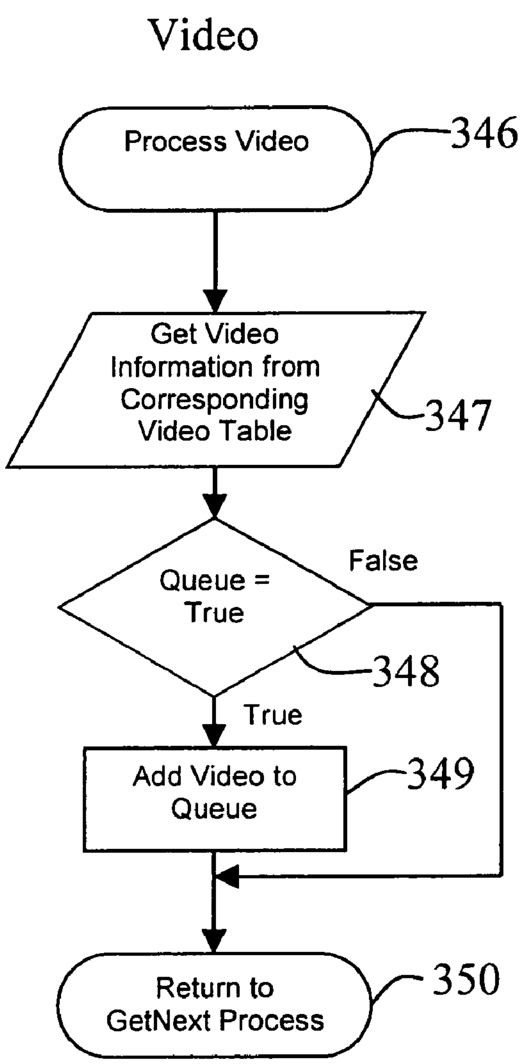
FIG. 26 is a logic flowchart for the function of processing video in this invention.

Still referring to FIG. 22, and also to FIG. 26, the "ProcessVideo" process 346 is more particularly explained. In particular, involving the "ProcessVideo" process 346 gets video file information 347 from the corresponding Video table in the database 100, described above, and populates the video object of the engine 300 with details about the video file, including the file name and choice of whether to "Play," "Queue," or "Play Queue." The ProcessVideo process queries 348 the video file details to determine if the video file is to be added to the storage queue ("Queue=True") or not ("Queue=False"). Where "Queue=True", the video file is added to the video storage queue 349, and the next logical process is passed to the "GetNextProcess" function 350. Where "Queue=False" 351, the step of adding the video file to the video storage queue 349 is bypassed, and the next logical process is passed to the "GetNextProcess" function 350. Where "Play=True," the video file is played at the user interface 200. Where "PlayQueue=True," all the video files in the video storage queue are played back at the user interface 200 sequentially in the order in which they were added into the video storage queue during the interrogation session.

Figure 26A:
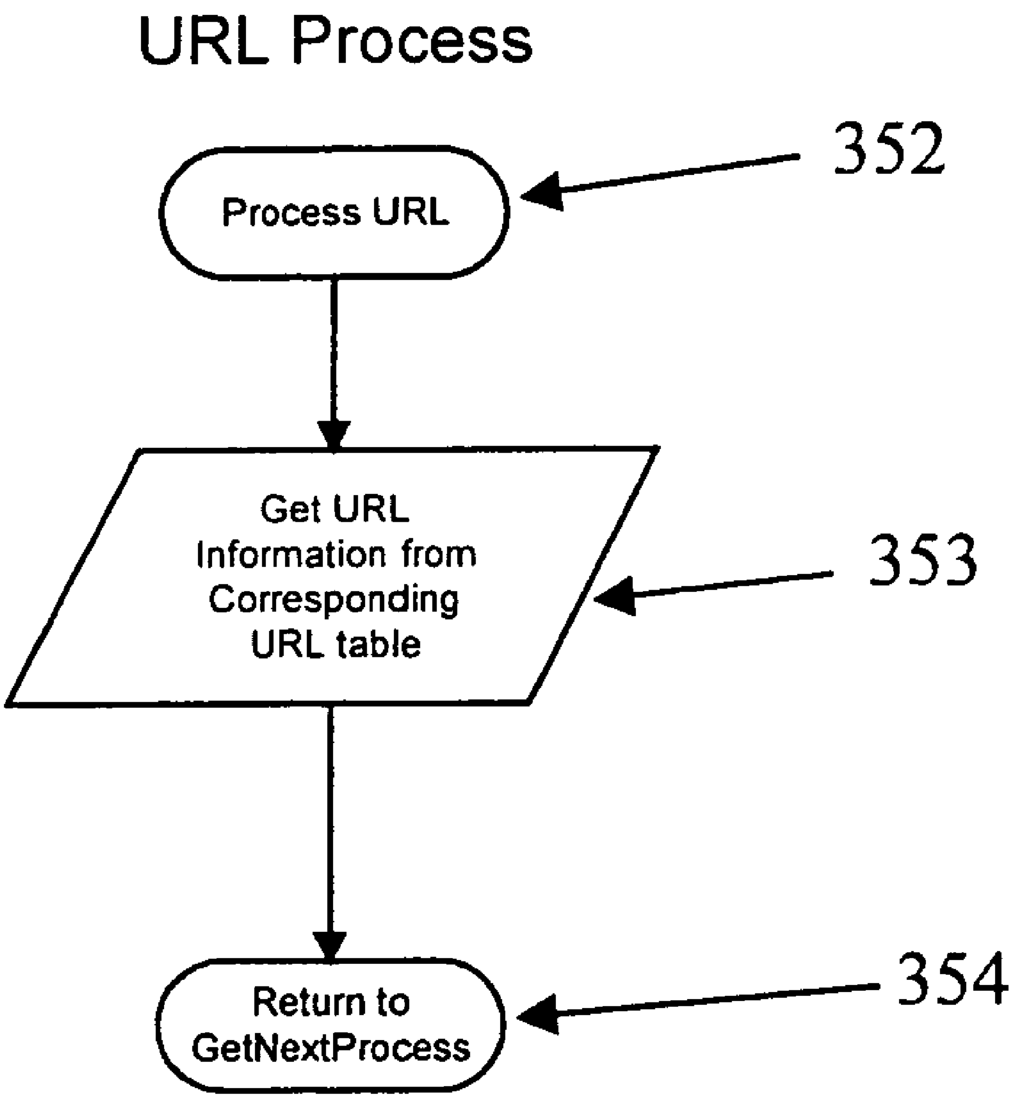
FIG. 26A is a logic flowchart for the function of processing URL information in this invention.

Referring now to FIGS. 21A and 26A, the URL process is more particularly explained. Specifically, the "ProcessURL" process 352 directs retrieval of URL process information 353 from the corresponding URL table in the database 100, described above, and populates the URL object of the engine 300 with details about a pre-identified web page. The web page 202 itself is then displayed in the user interface 200, for instance through conventional browser software framed within the interface, for user viewing and navigation through any linked web sites. Upon completion of the process—that is, when the user is finished viewing/navigating the web pages—the user chooses one of the "Back" or "Next" 209 tabs of the interface 200, which selection sends the next logical process to the engine for processing.

The foregoing process of determining the next process, executing it, and receiving user input to determine the subsequent process is repeated until an end point is encountered. Upon completion of a LastQuestion (designated as −1 for NextQuestion or from branching) the report writing function may be invoked, the operation of which is described elsewhere herein.

As indicated, the present invention enables user navigation, via the user interface, both forwards and backwards through an interrogatory path defined by an interrogation session. This will allow a user to change his mind and erase any associated responses from the answer file. The retracing of the processes encountered also allows reviewing any videos, images, web pages, text or answers to questions.

More particularly, a user can also select the "Back" navigational tab 209 at the user interface 200 (see, e.g., FIG. 21A), which action will invoke the "PreviousQuestion" process of the engine 300. This process traces backwards through the current interrogatory path, stopping at the first encounter of a question needing user input, or at a video or web/URL process, if such is present. This lets the user back through the questions which he has been interacting with, skipping any invisible processes that may have occurred.

To effect this backwards navigation, the "GetNextProcess" function of the engine 300 builds a "BackStack" 360 to facilitate tracking the current user's logical interrogatory path through the database 100 from the starting process (i.e., the first question) to the current question or other process being viewed (FIG. 22). The "BackStack" is created by the "GetNextProcess" function, which determines 361 whether or not a process (as identified by FM_ID number) is predefined for addition to the "BackStack." Where the query 361 for the retrieved record 302 indicates that the process is to be added to the "BackStack" ("BackStack=True"), then the process is added to the "BackStack" 360. Where the query 361 for the retrieved record 302 indicates that the process is not to be added to the "BackStack" ("BackStack=False"), then the process is not added to the "BackStack" 360, and the "GetNextProcess" function moves to the step of determining the question type 303, as described above.

Upon a user selecting the "Back" navigational tab 209 at the user interface 200, the "PreviousQuestion" function is called from the engine 300. The "PreviousQuestion" function removes the current question from the "BackStack," removes the answer for the last question from the "BackStack," and shows the last question requiring user interaction. For visible Interrogatory-type questions the "GetNextProcess" function is called to pass the last question. For invisible Interrogatory-type questions, the "PreviousQuestion" function is called again to repeat the process. For List Container questions, the so-called "OneInstance" function is called. The "OneInstance" function determines whether the question was asked of the user at this point in the interrogatory path, or referenced as an invisible question that was previously answered. If the question appears only once in the answer file, it was answered at this time in the logic flow and therefore needs to be presented again for user response. If the question appears more than once in the answer collection, it was referenced as an invisible question at this point of the logic flow therefore does not require user interaction. Encountering invisible questions in the "BackStack" requires the "PreviousQuestion" function to be executed again until a process, including, for example, a question, is encountered that requires user input. In conjunction with List Container questions, more particularly, the "OneInstance" function returns the result "True" if this question only appears once in the user answers collection, or the result "False" if the question appears more than once. If "OneInstance=True," the "GetNextProcess" function is called to pass this process. If "OneInstance=False," then the logic dictates that the question was asked previously and referenced at this point as an invisible question, and so the "PreviousQuestion" function is called again to keep working through the "BackStack." For Video processes, details about the current video process are loaded into the engine's video objects, with one of the possible following results: If "PlayVideo=True," that is, if the process instructs playing the video file, the "GetNextProcess" function is called to pass this process number. If "Queue=True," that is, if the process instructs storing the video file in the storage queue, the video is removed from the video storage queue, and the "PreviousQuestion" function is called again to keep working down the "BackStack." If "PlayQueue=True," that is, if the process instructs playing all video files in the storage queue, the "GetNextProcess" function is called to pass the current process number. Finally, if all three "PlayVideo," "Queue," and "PlayQueue" are "False"—that is, if there are no process instructions—the "GetNextProcess" is called to pass the current process number.

Figure 27:
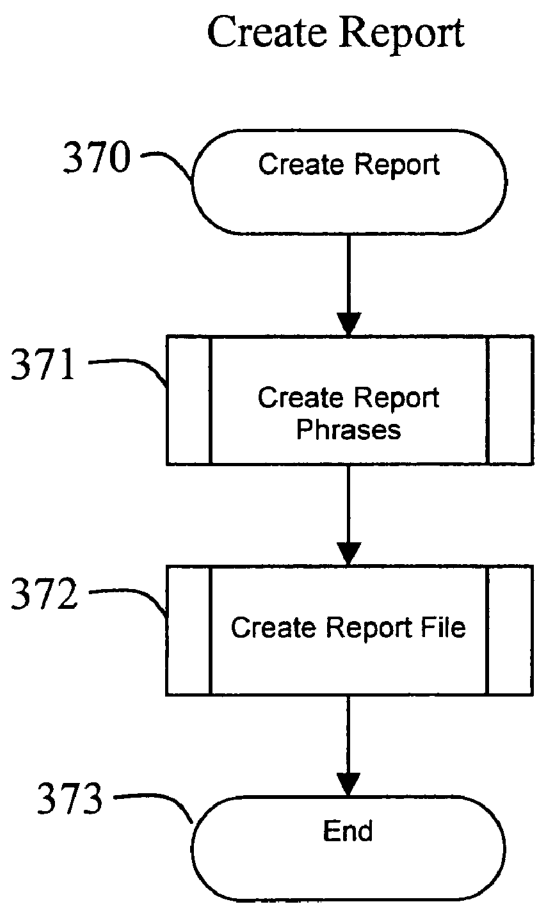
FIG. 27 is a logic flowchart for the report-generating process of the present invention.

Referring now to FIG. 27, the report writing process will be seen to comprise, in operation, the following general steps: Upon invoking the "Create Report" function 370 of the engine 300, a "Create Report Phrases" process 371 populates objects and collections from related report writing tables in database 100 and generates algorithms that match the phrase types in the order they appear. The engine 300 then iterates, via the "Create Report File" process 372, through the loaded phrases one by one, calling different algorithms depending upon the type of phrase encountered (e.g., Matching, TextBlock, LineBreak, etc.), and text is thereby added to a string of data comprising the report until the last phrase has been iterated 373. Upon completion of this iteration, the finished report is displayed at the user interface 200.

More particularly, in the exemplary program of the present invention, the report writing process operates as follows: The "CreateReport" function 370 calls the "CreateReportPhrases" process 371 and the "CreateReportFile" process 372. The "CreateReportPhrases" process 371 loads all phrases for a selected report into an array by "Pos" information as defined in the Phrases table, described above, which information dictates the relative position in the user report that the said phrase will occur, adding the phrases by type to the array by calling one or more of the following tables: "PhraseMatching," "PhraseTextBlock," "PhraseResponse," "PhraseScore," and/or "PhraseReportModule," the functions of which have previously been described.

Figure 28:
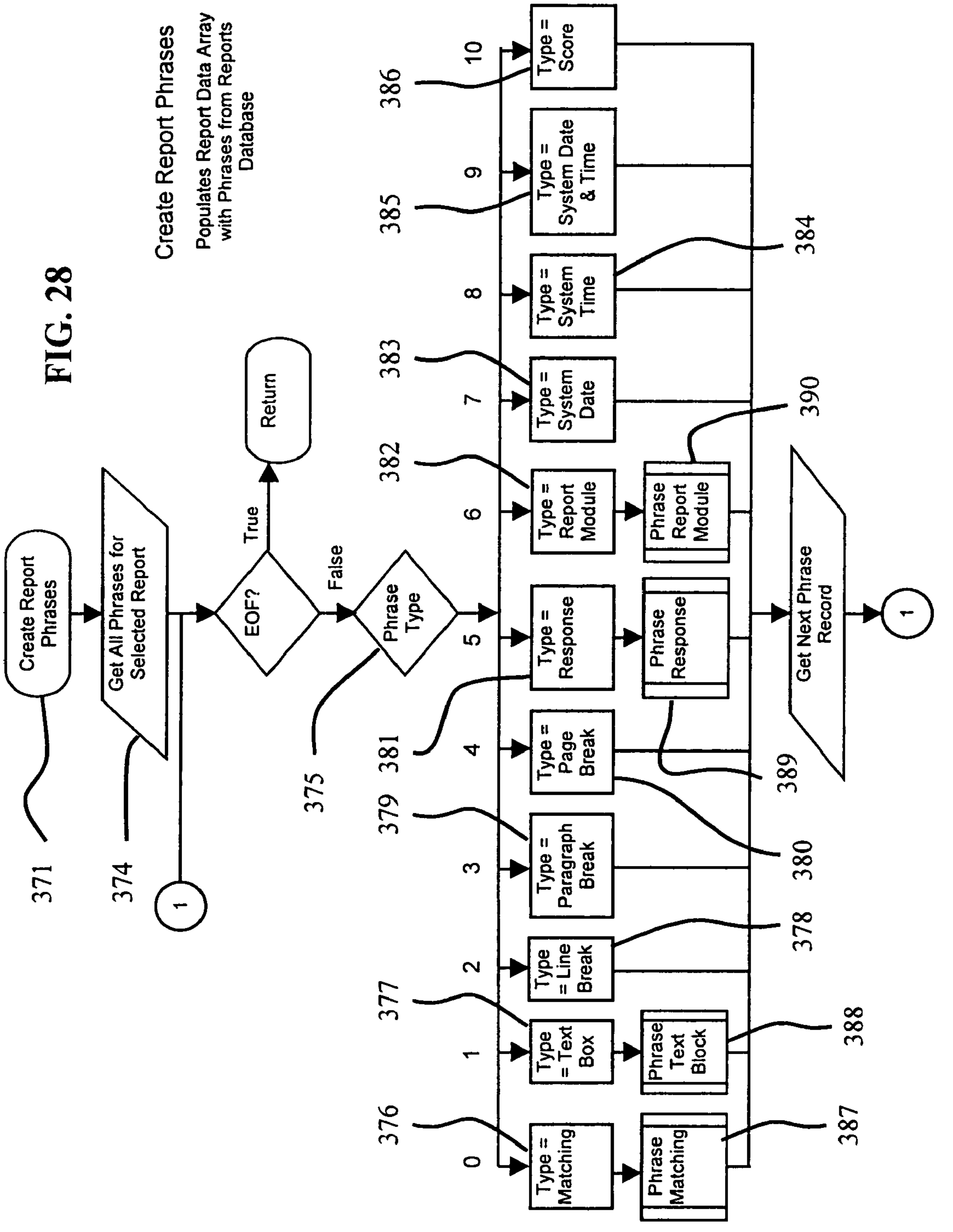
FIG. 28 is a logic flowchart for the Create Report Phrases function of the report-generating process.

In more detail, and as best shown in FIG. 28, the "CreateReportPhrases" process 371 retrieves all phrases for a selected report from the Phrases table (FIG. 13) of the database 374. These phrases for the selected report are retrieved one by one and added to an array, with further operations being performed as required depending upon the type of phrase retrieved. FIG. 28 specifically identifies the various phrase types described hereinabove, including "Matching" 376, "TextBox" 377, "LineBreak" 378, "ParagraphBreak" 379, "PageBreak" 380, "Response" 381, "ReportModule" 382, "SystemDate" 383, "SystemTime" 384, "SystemDate&Time" 385, and "Score" 386. Depending upon which of these phrase types is retrieved, shown in the decision step 375, one of the corresponding phrase processes may be performed. Thus, for instance a "Matching" phrase 376 will invoke the "Phrase Matching Process 387, a "TextBox" phrase 377 will invoke the "Phrase Text Block" process 388, a "Response" phrase 381 will invoke the "Phrase Response" process 389, a "Report Module" phrase 382 will invoke the "Phrase Report Module" process 390, and a "Score" phrase 386 will invoke the "Phrase Response" process 391.

The "Phrase Matching" process matches answers in the database 100 against defined rules for certain questions. These are referred to as "match" questions, and are characterized by the program of this invention as looking for agreement versus disagreement between the predetermined answers in the database 100 and the user's answers stored in the answer file. Specifically, the report writing tables include predefined phrases ready to be added to the data string for the report if the user's stored answer matches all, some, one or none of the predefined answers. The report writing tables also have preset strings to add to the main data string to correspond to any matching item. For example, if the user's stored answer matches the predefined answer to the question "are you thirsty?", the report writing tables might have reserved the word "thirst" to be added when needed to the user report. To facilitate this matching, a user's responses are stored in arrays or collections and one of their elements is binary to denote a match or mismatch with the desired results once the engine 300 has made a loop through the user's answers' file in response to encountering a match phrase item. The next step in this process is to determine if the answers match all, some, one or none of the desired responses, which step will determine what character string will be added to the report data string for the user report. For example, there may be an exclusionary phrase such as "the patient denies all the symptoms of diabetes" if the user answers "no" to a series of diabetes questions where "yes" was the predefined answer. If the user's answers matched "yes" to all questions, a phrase reserved for complete agreement, such as "the patient has diabetes," might be added to the string. If, however, the user's answer only had agreement in one of the questions (e.g., "are you thirsty?"), a phrase reserved for that possibility, such as "the patient's only symptom of diabetes was thirst," might be added to the main string. When more than one, but not all, conditions are met, a phrase assigned to that situation is added to the report data string, along with a list of the items that match the predefined answer, and an appropriate conjunction, such as "and" or "or," or no conjunction at all. In this situation in particular, the matching items are added to the report data string, with a comma after each such item, and before the final item is added, the connector designated in the database, is added to the string. The thus-created report sentence for partial matching might look like this: "The patient reports thirst, hunger and numbness".

Upon loading the "phrases" for the selected report, the engine 300 iterates, via the "CreateReportFile" process 372, through the phrases in the array generated by the "CreateReportPhrases" process 371 one item at a time, calling different algorithms based upon the type of phrase encountered. Each phrase in the array is processed in sequence, based on its characteristics. In some cases its function is to add a line feed or carriage return character to the string, in other cases its function is to add certain text characters, all as explained hereinabove. In the case of a "Response" phrase, a certain response in the answer file, identified by it's "A_Number," is sought via the "PhraseResponse" process, which process passes that response as ASCII characters into the developing report data string.

Figure 29:
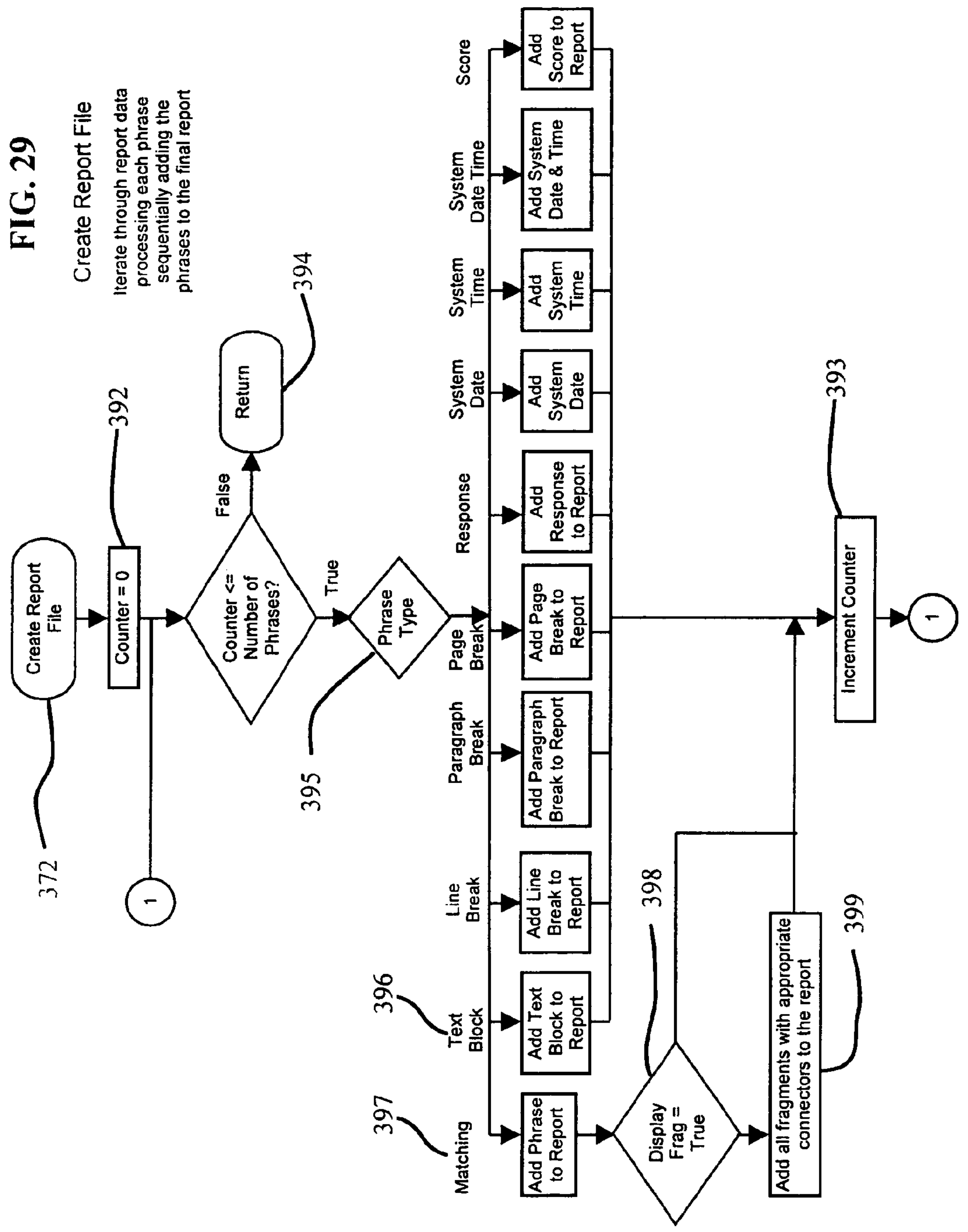
FIG. 29 is a logic flowchart for the Create Report File function of the report-generating process.

Referring to FIG. 29, the "CreateReportFile" process 372 will be understood in even more detail. In overview, the "CreateReportFile" process 372 iterates sequentially through each phrase in the array, adding phrases according to type to the report data string until all phrases in the array have been operated upon. To facilitate this sequential iteration, the engine 300 counts each phrase in the array using a counter 392. As each phrase is processed, the counter 392 is incremented 393. For each iteration through the array, the process decides whether the present value in the counter 392 is less than, equal to or greater than the number of phrases in the array. When the counter 392 is greater than ("Counter < or = Number of Phrases=False") the number of phrases in the array, the report data string is complete and the "CreateReportFile" process 372 returns the report to the user interface 394. When the counter 392 is less than or equal to ("Counter< or =Number of Phrases=True") the number of phrases in the array, the process determines the next phrase type in the array 395, and adds the phrase to the report data string according to the type of phrase and the action predefined therefor, all as described in more detail above. Thus, for example, the phrase type "TextBlock" 396 results in a predefined block of text being added to the report.

For "Matching" phrase types 397, the "CreateReportFile" process 372 decides if the phrase is a fragment or a complete phrase 398. Where the "Matching" phrase is a complete phrase ("Display Frag=False"), the phrase is added to the report data string. Where the "Matching" phrase is an incomplete phrase ("Display Frag=True"), all fragments with appropriate predefined connectors are added to the report data string 399.

The "Phrase Response" process 389, adds predefined phrases with the user's response inserted between the phrases. An example could be the phrases "The client is" and "years old." The user's response would be inserted between the phrases with the entire phrase added to the report. The final entire phrase could be "The client is 37 years old", with 37 as the answer to the question, "How old are you?".

Following addition of the phrase type to the report, the counter is incremented 393, and the process iterates through the array repeatedly until all phrases have been added.

It will be appreciated that the invention as described permits one or more knowledgeable persons to contribute their respective and/or collective expertise, for instance in the field of medical science, to the construction of a database of predetermined questions and answers for eliciting from a user, who may be a lay person or other individual of lesser expertise or skill, information necessary to achieve a desired result, such as, for example, performing a medical diagnosis, generating a medical history, generating a personalized instructional video, etc.

And while the invention hereof has been described in operational terms particularly as a medical diagnostic or history-taking tool, as a mechanical-apparatus diagnostic and repair tool, and also as a training or instructional tool, it will be appreciated that the software and system of this invention are not so limited, and may therefore be adapted to a multitude of other applications, including any applications where a content-tailored result, including in the form of video output, is desired to be generated in response to a user-interrogation. Such applications may further include, without limitation, personalized entertainment.

Of course, the foregoing disclosure is exemplary of the invention only, and is not intended to be limiting thereof: Other modifications, alterations, and variations thereof, within the level of ordinary skill in the art, are certainly possible, with the benefit of this disclosure, without departing from the spirit and broader aspects of the invention as set forth in the appended claims.

The invention in which an exclusive property or privilege is claimed is defined as follows:

1. A computer program, tangibly embodied on at least one computer-readable memory device, for interrogating a user and generating a result based upon the user's interrogatory answers, the computer program comprising:

code for a database comprising a plurality of predefined questions and associated, predefined answers, wherein the plurality of questions and answers are organized in a predefined relationship between a pre-designated starting question and one or more ending questions to thereby define a plurality of possible logical interrogatory paths through the database, and wherein further the selection of any one of the plurality of possible logical paths is user-answer dependent;

code for a user interface for displaying questions from the database to be answered by a user, and for accepting answers from a user; and code for an engine operative to present questions from the database to the user interface to be answered by a user, and to navigate one of the plurality of possible logical interrogatory paths defined by the relationship between the pre-designated starting question and the one or more ending questions as dictated by a user's answers to the questions presented at the user interface.

2. The computer program of claim 1, wherein the database further comprises content and rules for generating at least one report based upon a user's answers to questions presented at the user interface, the content and rules having a predefined relationship with the plurality of predefined questions and answers of the database so that the content of the at least one report is dependent upon a user's answers to questions from the database, and wherein further the engine is operative to generate from the reporting database at least one report using the content and rules from the database.

3. The computer program of claim 2, wherein the database comprising a plurality of predefined questions and associated, predefined answers, includes questions and answers for evaluating a user's level of knowledge respecting a particular subject matter, and wherein further the content and rules for generating the at least one report based upon a user's answers to questions presented at the user interface include content and rules for generating a test score indicative of a user's level of knowledge respecting the particular subject matter.

4. The computer program of claim 1, wherein the code for the database, the user interface, and the engine are all tangibly embodied on the same computer-readable memory device.

5. The computer program of claim 1, wherein the database further comprises one or more video files, wherein the engine is operative to display one or more of the one or more video files at the user interface, and wherein further the one or more video files are associated with the predefined questions and answers of the database so that the display of the one or more video files at the user interface is dependent upon a user's answers to questions from the database.

6. The computer program of claim 5, wherein the engine is operative to display a plurality of the video files at the user interface in a continuous sequence the order of which is defined by a user's answers to questions from the database.

7. The computer program of claim 1, wherein the database further comprises one or more URL addresses, wherein the engine is operative to display the URL addresses at the user interface, and wherein further the one or more URL addresses are associated with the predefined questions and answers of the database so that the display of the URL addresses at the user interface is dependent upon a user's answers to questions from the database.

8. The computer program of claim 7, wherein the engine is operative to display a plurality of the URL addresses at the user interface in a sequence the order of which is defined by a user's answers to questions from the database.

9. A computer-based system for interrogating a user and generating a result based upon the user's interrogatory answers, the system comprising:

at least one computer including a computer-readable memory device encoded with a database comprising a plurality of predefined questions and associated, predefined answers, wherein the plurality of questions and answers are organized in a predefined relationship between a pre-designated starting question and one or more ending questions to thereby define a plurality of possible logical interrogatory paths through the database, and wherein further the selection of any one of the plurality of possible logical paths is user-answer dependent;

at least one user interface for displaying questions from the at least one computer comprising the database to be answered by a user, and for accepting answers from a user provided in response to the displayed questions; and at least one computer including a computer-readable memory device encoded with an engine to present questions from the database to the user interface to be answered by a user, and to navigate one of the plurality of possible logical interrogatory paths defined by the relationship between the pre-designated starting question and the one or more ending questions as dictated by a user's answers to the questions presented at the user interface.

10. The system of claim 9, wherein the database further comprises content and rules for generating at least one report based upon a user's answers to questions presented at the user interface, the content and rules having a predefined relationship with the plurality of predefined questions and answers of the database so that the content of the at least one report is dependent upon a user's answers to questions from the database, and wherein further the engine is operative to generate from the reporting database at least one report using the content and rules from the database.

11. The system of claim 10, wherein the database comprising a plurality of predefined questions and associated, predefined answers, includes questions and answers for evaluating a user's level of knowledge respecting a particular subject matter, and wherein further the content and rules for generating the at least one report based upon a user's answers to questions presented at the user interface include content and rules for generating a test score indicative of a user's level of knowledge respecting the particular subject matter.

12. The system of claim 9, wherein at least one computer comprising the database, and the at least one computer comprising the engine all comprise the same computer.

13. The system of claim 9, wherein the at least one user interface is displayed at a location physically remote from the at least one computer comprising the database and the at least one computer comprising the engine.

14. The system of claim 9, wherein the database further comprises one or more video files, wherein the engine is operative to display one or more of the one or more video files at the user interface, and wherein further the one or more video files are associated with the predefined questions and answers of the database so that the display of one or more video files at the user interface is dependent upon a user's answers to questions from the database.

15. The system of claim 14, wherein the engine is operative to display a plurality of the video files at the user interface in a continuous sequence the order of which is defined by a user's answers to questions from the database.

16. The system of claim 9, wherein the database further comprises one or more URL addresses, wherein the engine is operative to display the URL addresses at the user interface, and wherein further the one or more URL addresses are associated with the predefined questions and answers of the database so that the display of URL addresses at the user interface is dependent upon a user's answers to questions from the database.

17. The system of claim 16, wherein the engine is operative to display a plurality of the URL addresses at the user interface in a sequence the order of which is defined by a user's answers to questions from the database.

18. A method for interrogating a user and generating a result based upon the user's interrogatory answers, the computer program comprising:

interrogating a user with predefined questions from a computer database comprising the predefined questions and associated, predefined answers, wherein the plurality of questions and answers are organized in a predefined relationship between a pre-designated starting question and one or more ending questions to thereby define a plurality of possible logical interrogatory paths through the database, and wherein further the selection of any one of the plurality of possible logical paths defined by the relationship between the pre-designated starting question and the one or more ending questions is user-answer dependent, and wherein further the interrogation step is facilitated by an user interface operative to display the predefined questions from the at least one computer database to be answered by a user, and to accept answers from a user provided in response to the displayed questions; and displaying a result at the user interface following the interrogation step, wherein the result is based upon a user's answers to the displayed questions.

19. The method of claim 18, further comprising the step of providing a computer database comprising content and rules for generating at least one report based upon a user's answers to questions displayed at the user interface, the content and rules having a predefined relationship with the plurality of predefined questions and answers so that the content of the at least one report is dependent upon a user's answers to questions from the database, and wherein further the step of displaying a result at the user interface comprises displaying at least one report generated using the content and rules from the database.

20. The method of claim 18, wherein the computer database further comprises one or more video files associated with the predefined questions and answers of the database, and wherein further the step of displaying a result at the user interface comprises displaying one or more of the one or more video files at the user interface depending upon a use's answers to the questions from the database.

* * * * *